(12) United States Patent
Boyle et al.

(10) Patent No.: US 11,144,845 B2
(45) Date of Patent: Oct. 12, 2021

(54) USING ARTIFICIAL INTELLIGENCE TO DESIGN A PRODUCT

(71) Applicant: Stitch Fix, Inc., San Francisco, CA (US)

(72) Inventors: Erin S. Boyle, San Francisco, CA (US); Daragh Sibley, San Francisco, CA (US)

(73) Assignee: Stitch Fix, Inc., San Francisco, CA (US)

( * ) Notice: Subject to any disclaimer, the term of this patent is extended or adjusted under 35 U.S.C. 154(b) by 1026 days.

(21) Appl. No.: 15/612,080

(22) Filed: Jun. 2, 2017

(65) Prior Publication Data

US 2018/0349795 A1    Dec. 6, 2018

(51) Int. Cl.
*G06N 20/00* (2019.01)
*G06N 5/04* (2006.01)
(Continued)

(52) U.S. Cl.
CPC ....... *G06N 20/00* (2019.01); *G06F 16/24578* (2019.01); *G06F 16/9535* (2019.01);
(Continued)

(58) Field of Classification Search
CPC .......... G06N 20/00; G06N 5/04; G06F 30/00; G06F 16/9535; G06F 16/24578;
(Continued)

(56) References Cited

U.S. PATENT DOCUMENTS

| 9,704,232 B2 * | 7/2017 | Karam ............... G06K 9/00201 |
| 2003/0176931 A1 * | 9/2003 | Pednault .............. G06K 9/6282 700/31 |

(Continued)

FOREIGN PATENT DOCUMENTS

WO    WO2016004075    1/2016

OTHER PUBLICATIONS

The gap between predicted and measured energy performance of buildings: A framework for investigation Pieter de Wilde (Year: 2014).*

(Continued)

*Primary Examiner* — Kakali Chaki
*Assistant Examiner* — Ababacar Seck
(74) *Attorney, Agent, or Firm* — Van Pelt, Yi & James LLP

(57) ABSTRACT

In an embodiment, a method for optimizing computer machine learning includes receiving an optimization goal. The optimization goal is used to search a database of base option candidates (BOC) to identify matching BOCs that at least in part matches the goal. A selection of a selected base option among the matching BOCs is received. Machine learning prediction model(s) are selected based at least in part on the goal to determine prediction values associated with alternative features for the selected base option, where the model(s) were trained using training data to at least identify weight values associated with the alternative features for models. Based on the prediction values, at least a portion of the alternative features is sorted to generate an ordered list. The ordered list is provided for use in manufacturing an alternative version of the selected base option with the alternative feature(s) in the ordered list.

19 Claims, 15 Drawing Sheets

(51) Int. Cl.
  *G06F 16/2457* (2019.01)
  *G06Q 10/04* (2012.01)
  *G06Q 10/06* (2012.01)
  *G06F 16/9535* (2019.01)
  *G06Q 30/02* (2012.01)
  *G06F 30/00* (2020.01)
  *G06F 113/12* (2020.01)

(52) U.S. Cl.
  CPC .............. *G06F 30/00* (2020.01); *G06N 5/04* (2013.01); *G06Q 10/04* (2013.01); *G06Q 10/063* (2013.01); *G06Q 10/067* (2013.01); *G06Q 30/02* (2013.01); *G06F 2113/12* (2020.01)

(58) Field of Classification Search
  CPC .. G06F 2113/12; G06Q 10/04; G06Q 10/067; G06Q 10/063; G06Q 30/02
  See application file for complete search history.

(56) References Cited

U.S. PATENT DOCUMENTS

| | | | |
|---|---|---|---|
| 2004/0204957 A1* | 10/2004 | Afeyan | G06Q 30/02 706/13 |
| 2007/0226073 A1 | 9/2007 | Wang | |
| 2007/0282666 A1* | 12/2007 | Afeyan | G06Q 30/02 706/13 |
| 2008/0071741 A1 | 3/2008 | Omi | |
| 2015/0006518 A1 | 1/2015 | Baumgartner | |
| 2015/0379426 A1* | 12/2015 | Steele | G06N 20/00 706/12 |
| 2015/0379429 A1* | 12/2015 | Lee | G09B 5/00 706/11 |

OTHER PUBLICATIONS

Hernandez, Next Top Fashion Designer? A Computer, Mar. 13, 2017.

* cited by examiner

200

Design Tool

900

920:
- Business Line: Womens
- Class: Blouses
- Client Segment: Segment 1
- Fiscal Quarter: Q4
- Silhouette: All
- Feature: print_name
- Value: abstract 940:
- Brand Type: ● Both ○ EB ○ Market
- Minimum shipments: 25
- Page: 1

930: Body Recommendations | Style Variant Based Replacement Recs | Best Style Variants with Feature | Feature Success In Isolation
Feature Contribution | Feature Success By Silhouette | Feature Pair Interaction | Inventory Holes 960:
- Ranking metrics for Base Option 1
- Ranking metrics for Base Option 2
- Ranking metrics for Base Option 3
- Ranking metrics for Base Option 4
- Ranking metrics for Base Option 5
- Ranking metrics for Base Option 6
- Ranking metrics for Base Option 7
- Ranking metrics for Base Option 8

FIG. 9

Select a target client segment and a season:

Select one of our recommended bodies for that client group & time period:

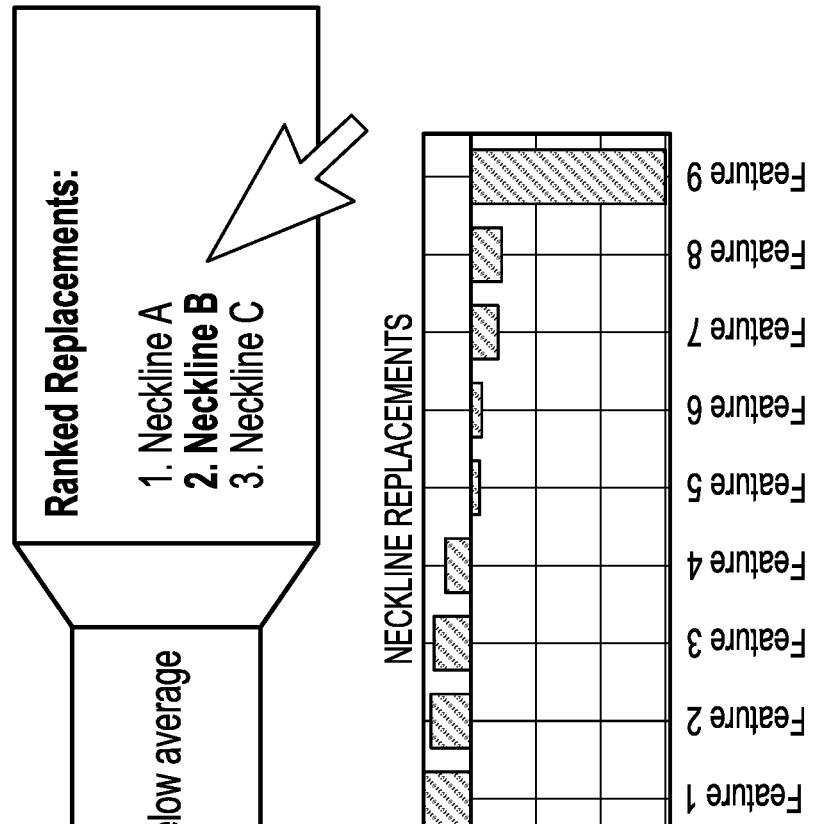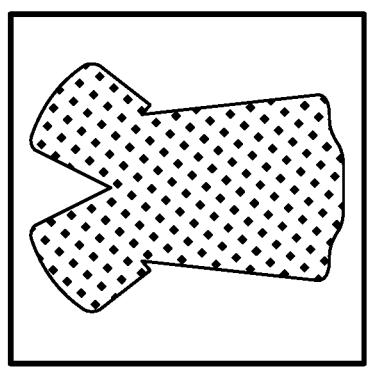
FIG. 13

Save Your Design Sheet as a Pdf!
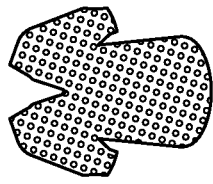
Neckline of SVID 00001:
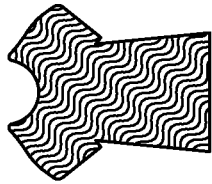
Hemline of SVID 00002:
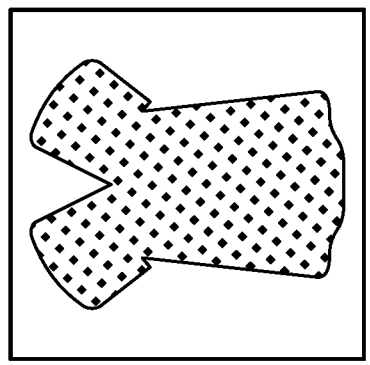
Body of SVID 00000
Designer Notes:
- Intended Group: Segment 3 Clients
- Intended Quarter: Q4
FIG. 15

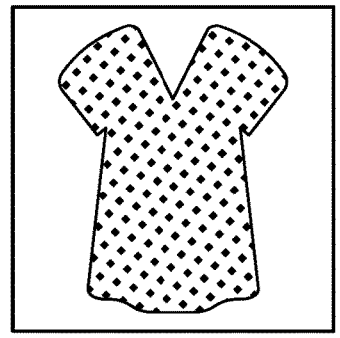
Product Preview
1610
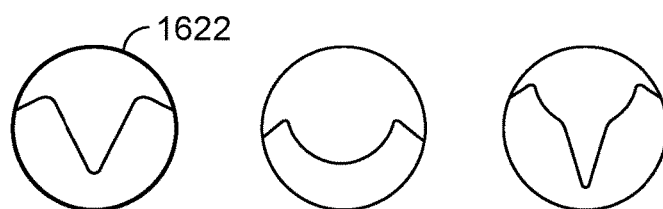
Neckline
1620
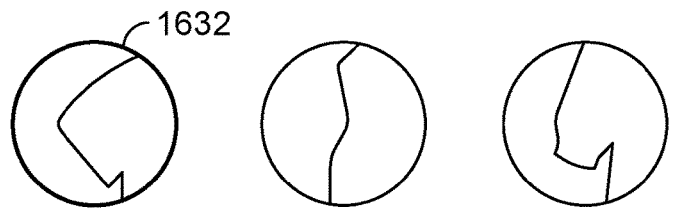
Sleeve
1630
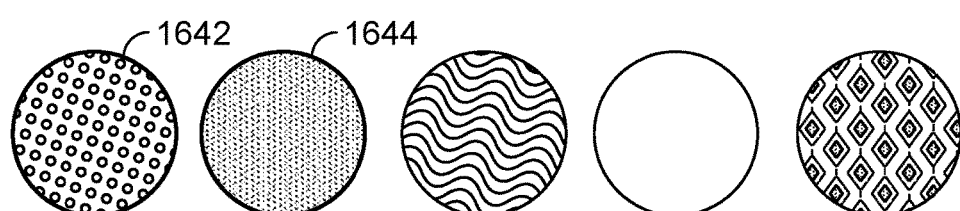
Fabric
1640
Fig. 16

1700

USING ARTIFICIAL INTELLIGENCE TO DESIGN A PRODUCT

BACKGROUND OF THE INVENTION

Designing a product to meet one or more goals can be difficult. For example, it may be challenging to determine what aspect of a product contributes to the success of the product. Designing for a particular metric of success may also vary. That is, success may be defined by different metrics or dimensions. Conventional techniques for product design typically rely on the intuition of a human designer. However, a human designer is often unable to fully assess all data that might be collected about features that could be added to a product or with which a product may be modified. Conventional computer-aided product design tools are unable to leverage data to guide the designer to optimal design decisions. For example, conventional product design tools are typically unable to be flexible about design or performance goals.

SUMMARY OF THE INVENTION

The present application discloses a method for optimizing computer machine learning that includes the steps of receiving an optimization goal, using the optimization goal to search a database of base option candidates to identify one or more matching base option candidates that at least in part matches the optimization goal, receiving a selection of a selected base option among the matching base option candidates, utilizing one or more machine learning prediction models selected based at least in part on the optimization goal to determine prediction values associated with alternative features for the selected base option, wherein the one or more machine learning prediction models were trained using training data to at least identify machine learning weight values associated with the alternative features for the one or more machine learning prediction models, based on the prediction values, sorting at least a portion of the alternative features to generate an ordered list of at least the portion of the alternative features for the selected base option, and providing the ordered list for use in manufacturing an alternative version of the selected base option with one or more of the alternative features in the ordered list.

The present application further discloses a system for optimizing computer machine learning that includes a communications interface configured to receive an optimization goal and receiving a selection of a selected base option among matching base option candidates. The system further includes a processor configured to utilize one or more machine learning prediction models selected based at least in part on the optimization goal to determine prediction values associated with alternative features for the selected base option, wherein the one or more machine learning prediction models were trained using training data to at least identify machine learning weight values associated with the alternative features for the one or more machine learning prediction models, based on the prediction values, sort at least a portion of the alternative features to generate an ordered list of at least the portion of the alternative features for the selected base option, and provide the ordered list for use in manufacturing an alternative version of the selected base option with one or more of the alternative features in the ordered list.

The present application further discloses a computer program product for optimizing computer machine learning, the computer program product being embodied in a non-transitory computer readable storage medium and comprising computer instructions for receiving an optimization goal, using the optimization goal to search a database of base option candidates to identify one or more matching base option candidates that at least in part matches the optimization goal, receiving a selection of a selected base option among the matching base option candidates, utilizing one or more machine learning prediction models selected based at least in part on the optimization goal to determine prediction values associated with alternative features for the selected base option, wherein the one or more machine learning prediction models were trained using training data to at least identify machine learning weight values associated with the alternative features for the one or more machine learning prediction models, based on the prediction values, sorting at least a portion of the alternative features to generate an ordered list of at least the portion of the alternative features for the selected base option, and providing the ordered list for use in manufacturing an alternative version of the selected base option with one or more of the alternative features in the ordered list.

BRIEF DESCRIPTION OF THE DRAWINGS

Various embodiments of the invention are disclosed in the following detailed description and the accompanying drawings.

FIG. 9 shows an example GUI of a design tool for generating a design of a product.

FIG. 13 is an example of a GUI for providing alternative feature selection options and receiving a selection of one or more alternative features for generating a product.

FIG. 15 is an example of a design sheet associated with a computer-generated product.

FIG. 16 is an example of a GUI for generating a preview of a product.

DETAILED DESCRIPTION

Figure 2:
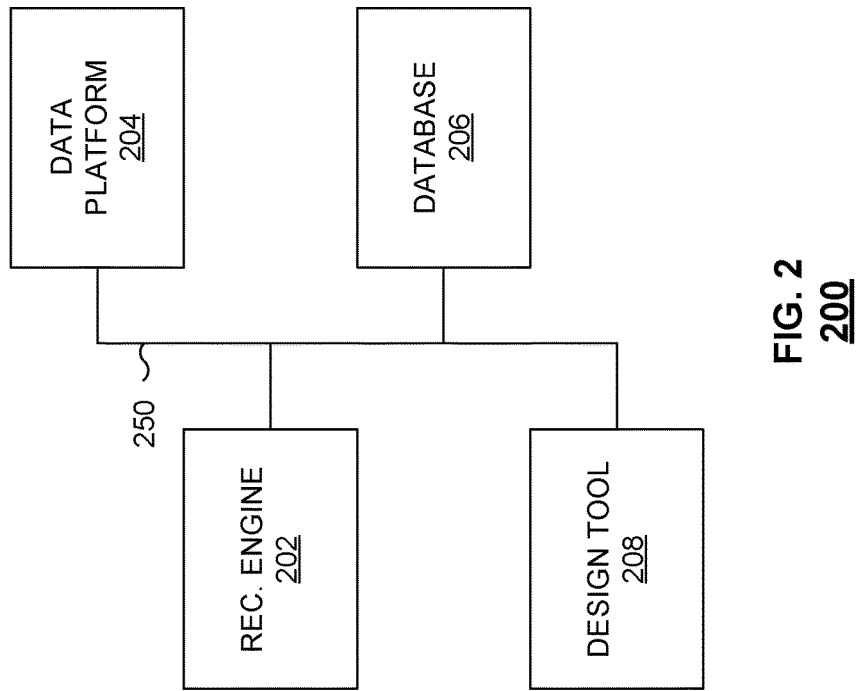
FIG. 2 is a block diagram illustrating an embodiment of a system for selecting and providing products.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Design of a product using artificial intelligence is disclosed. New products are commonly designed to include product features selected based on intuition of a designer. However, given technological advancements in machine learning and artificial intelligence as well as big data analysis capabilities, new products are able to be designed at least in part using machine learning and artificial intelligence based on vast amounts of empirical data that would be impossible to analyze without the assistance of computers.

In various embodiments, optimizing computer machine learning to generate a design of a product includes receiving an identifier of an optimization goal. For example, the goal may include design and/or performance goals. In some embodiments, an example of a performance goal is "designing a new product that will be commercially successful for customers in Client Segment 1 for use in the winter season." A client segment may be a shared characteristic among those clients falling into the client segment. A client segment may also be defined by shared observed preferences. An example of a design goal is one or more features that must be included in the design of a product such as "designing a new product that incorporates polka dots." A product generated by the processes described herein may be based on a base option, which may be defined by a set of one or more features. In some embodiments, starting from a blank template, one or more features may be added to define the base option. Using the example of "designing a new product that incorporates polka dots," the base option specifies "polka dots" as an included feature. In some embodiments, starting from the base option, one or more features may be swapped out and/or added. For example, the base option may be a body and/or defined by fit specifications. The base option may be a style in inventory (e.g., an existing style), and features may be modified from the base option.

The optimization goal may be used to search a database of base option candidates to identify one or more matching base option candidates. For example, an inventory of base options is searched to automatically identify candidates that best match the optimization goal. In response to providing the candidate base options, a selection of a base option may be received. The selection may be made by a user (e.g., a human designer) from among the matching base options. For example, this represents human cooperation with machine learning and is also known as "human-in-the-loop machine learning." The selected base option may be utilized as the basis of a resulting artificial intelligence assisted product design. For example, one or more attributes/features of the base option may be replaced with corresponding alternative feature(s) and/or one or more new alternative attributes/features may be added to the base option with the assistance of machine learning/artificial intelligence to create a product, which is an even better product design that optimizes the optimization goal. Thus, by selecting a base option rather than starting from a blank slate of product features, already known to be successful products may be iteratively improved.

To determine what attributes/features to add or replace in a base option, one or more machine learning prediction models selected based at least in part on the optimization goal is utilized to determine prediction values associated with alternative features for the selected base option. The one or more machine learning prediction models were trained using training data to at least identify machine learning weight values associated with the alternative features for the one or more machine learning prediction models. For example, an alternative feature or a combination of features may be provided to a trained machine learning model to determine a goal optimization prediction score for the feature or combination of features with respect to the optimization goal and/or the selected base option. Based on the prediction values, at least a portion of the alternative features may be sorted to generate an ordered list of the at least portion of the alternative features for the selected base option. For example, the goal optimization prediction scores of the features may be used to rank the features with respect to predictions on how their inclusion in the base option would positively impact the goal optimization. The ordered list may be provided for use in manufacturing an alternative version of the selected base option with one or more of the alternative features in the ordered list. For example, one of the alternative features is selected for inclusion in the base option due to its high rank in the order and a design specification that identifies the selected alternative feature may be generated to be used to manufacture the resultant product, which is an alternative version of the selected base option.

Figure 1:
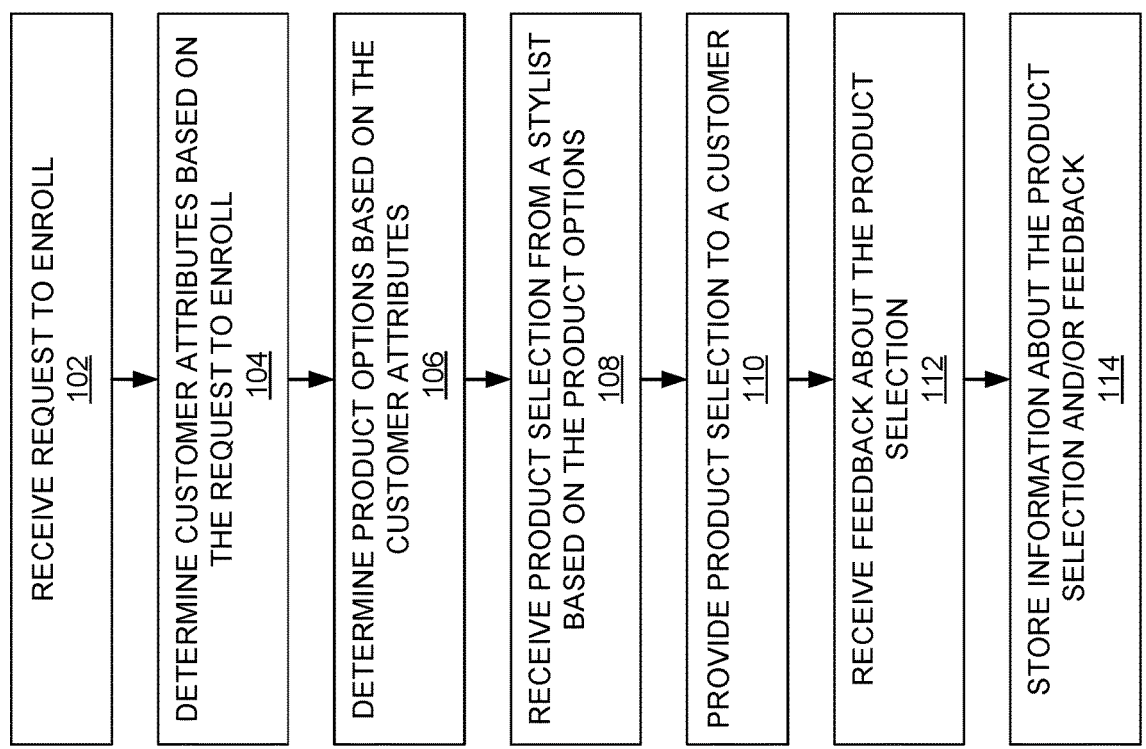
FIG. 1 is a flow chart illustrating an embodiment of a process for selecting and providing products.

FIG. 1 is a flow chart illustrating an embodiment of a process for selecting and providing products. In some embodiments, at least some of the products selected and provided to the customer may be products generated according to the processes described herein. The process of FIG. 1 may be at least in part implemented on one or more components of system 200 shown in FIG. 2. For example, the process may be performed by data platform 204 and recommendations engine 202 with respect to database 206 and design tool 208. In some embodiments, the process of FIG. 1 is performed by processor 1702 of FIG. 17.

At 102, a request to enroll is received. The request to enroll may be received from a potential customer requesting recommendations and/or products. The customer may be enrolled with a product selection and distribution system such as the system of FIG. 2. Upon enrollment, the potential customer becomes a customer and information about the customer may be stored. Products may be provided to the customer once or on a recurring/subscription basis. Products may be selected for a customer based on the customer's preferences which may be learned over time. In some embodiments, the products selected for the customer may be products, which are products designed with the assistance of artificial intelligence/machine learning to modify an existing base option/product to optimize an optimization goal. As part of enrollment, the customer may provide information about his or her preferences. For example, the customer may provide information directly or indirectly. The information may be provided through a personalized app or third party styling or messaging platforms. This information may be stored in a database such as database 206 of FIG. 2.

At 104, customer attributes are determined based on the request to enroll. Customer attributes may include objective attributes such as biographical information, and measurements, and other client segments. Customer attributes may include subjective attributes such as preferences for style, fit, colors, designers/brands, and budget. For example, a customer may rate specific styles, prints, and/or attributes including those products in an inventory and products from other providers. The information may be collected through third party apps or platforms such as apps that allow a user to indicate interests and/or share interest in products with other users. Customer attributes may be collected when a customer enrolls with the system. For example, the customer may complete a survey about his or her measurements (height, weight, etc.), lifestyle, and preferences. This information may be stored to a customer profile. Customer attributes may be determined from social media and content created or curated by the customer on third party platforms such as Pinterest®, Instagram®, Facebook®, LinkedIn®, and the like.

When the customer makes purchases and provides feedback on products, customer attributes may be updated. For example, the customer profile may be updated. The customer may provide feedback in various formats including completing surveys, writing product reviews, making social media posts, and the like regarding one or more products. Products recommended to the customer may be adapted to a customer's changing attributes and taste. In one aspect, the customer's taste may be learned over time by a computer system and/or stylist.

In various embodiments, customer attributes may be determined based on generalizations about other users who share characteristics with a particular customer. Generalizations about groups of customers may be made from individual customer attributes. Customers may be grouped by any characteristic, including gender, body type, shared preference (e.g., a measure of similarity between clients such as clients' objective or subjective attributes or learned similarity in product preferences), and the like.

At 106, product options are determined based on the customer attributes. The product options may be determined by processing the customer attributes to select a subset of products from all products in an inventory. The product options may be provided to stylists. In various embodiments, instead of directly offering all of the product options to the customer, a stylist first selects products from among the product options to provide to the customer.

At 108, a product selection is received from a stylist based on the product options. A stylist (e.g., a human user) selects a product selection from the product options. The product selection may then be offered to a customer. Suppose a customer is looking for blouses. One or more blouses may be automatically selected from the inventory based on the customer's attributes. Instead of providing the blouses directly to a customer, a stylist selects a sub-set of blouses to offer to the customer. Statistics about the product selection such as whether an item was selected to be part of the product selection, when the item was selected to be part of the product selection, for who/what type of customer was the item selected, etc. can be stored.

At 110, a product selection is provided to a customer. A shipment of items may be provided to a customer. The customer may then decide to keep or return one or more of the items in the shipment. If the customer decides to keep an item, then the customer purchases the item. Statistics about the items such as whether they were kept or returned, when they were kept or returned, who/what type of customer kept or returned the item can be stored.

At 112, feedback about the product selection is received. A customer may provide feedback about the product selection such as reasons why the customer is keeping or not keeping one or more items in the product selection. The feedback may be provided by the customer in various formats including completing surveys, writing product reviews, making social media posts, and the like. The feedback may be stored and associated with the customer and/or the item. In various embodiments, the feedback may be used to design products that might appeal to a particular customer base or meet optimization goals.

At 114, information about the product selection and/or feedback is stored. For example, a tracked sales metric of the item is updated. In some embodiments, the sales and feedback information associated with the item may be stored in a database such as database 206 of FIG. 2.

FIG. 2 is a block diagram illustrating an embodiment of a system for selecting and providing products. In some embodiments, the products selected and provided to the customer may be products generated according to the processes described herein. The example system 200 shown in FIG. 2 includes recommendations engine 202, data platform 204, and database 206, and design tool 208. Each of these components may be communicatively coupled via network 250.

The recommendations engine 202 may be configured to employ adaptive machine learning to provide recommendations to stylists who select items for customers from an item inventory. For example, the system may use a machine learning trained model to score products. The top scoring products may be provided to the stylist. The stylist (e.g., a human) then selects one or more of the top scoring products to be offered to a customer. The customer may purchase/keep the product and/or provide feedback about the product. The feedback may be used to improve the machine learning training models.

The data platform 204 may be configured to coordinate operation of recommendations engine 202, database 206, and design tool 208. For example, when data is generated by interaction of a customer, stylist, designer, and/or supplier with system 200, the data platform 204 may determine what information is to be stored. For example, the data platform may store the data as part of a training data set for machine learning as further described herein. The data platform may be configured to perform the processes described herein, e.g., the process shown in FIG. 3. In various embodiments, design tool 208 may be communicatively coupled to data platform 204 and the data platform 204 may be configured to perform the processes shown in FIGS. 4-6 based on input received at the design tool 208.

The database 206 may be configured to store information about customers, products, sales data, performance metrics, and machine learning models. Product information may include data associated with a product or group of products. Product information may include objective attributes of the product such as a stock keeping unit (SKU), item type, item property (e.g., color, pattern, material), etc. Product information may include subjective attributes of the product such as suitability for body types, season, etc. Product attributes may be identified by a human or by a machine. Product information may include a representation of the product such as text, image, video, or other form of data. In some embodiments, information about an item may be stored with associated information such as customer feedback about the item. In some embodiments, information about an item may be stored with statistics such as a sales metric (e.g., statistics related to sales of an item or group of items), an inventory metric (e.g., statistics related to inventory such as number of units in inventory), variety (e.g., a measure of diversity of inventory and related information such as addressable market). In various embodiments, information about an item may be stored with one or more associated ratings such as style rating (e.g., a measure of customer satisfaction with a style of an item), size rating (e.g., a measure of an accuracy of the identified size of an item), fit rating (e.g., a measure of customer satisfaction with how well the item fits), quality rating (e.g., a measure of customer satisfaction with quality of an item), retention measure (e.g., a measure of a likelihood that a product leads to a future purchase by a customer), personalization measure (e.g., a measure of customer satisfaction with how well an item matches a customer's personality and uniqueness), style grouping measure (e.g., a likelihood that an item is categorized in a particular group), price value rating (e.g., a rating of a value of the item with respect to its price), and the like. In various embodiments, information about an item may be stored that scores the style with an aggregate metric that represents appropriate weighting/value of any or all of the preceding metrics together.

In various embodiments, the database 206 stores information about how many units of each item are in the inventory. Supply chain information may be stored such as how many units of an item has been ordered, when they are expected to be received to replenish a stock of the item, etc.

As described herein, an alternative feature of a base option may be assessed based on its performance with respect to a metric. The alternative feature may be ranked highly if it is predicted to perform well for a selected metric of an overall optimization goal. The evaluation metrics may correspond to one or more machine learning models that quantify an evaluation metric value for different sets of features to evaluate whether replacement/addition of the alternative feature in the set of features better achieves an optimization goal.

In various embodiments, an alternative feature may be selected based at least in part on collaborative filtering and/or client segmentation. For example, an alternative feature may be selected based on a likelihood that a style would fall into a cluster (e.g., an addressable market). To determine whether a style would fall into a cluster, a set of features making up the style may be analyzed to determine whether the set would cause the style to be categorized in a specific way (e.g., whether it would be classified in a particular stylistic category. The cluster may be based on feedback such as feedback from a third party app or platform.

Figure 3:
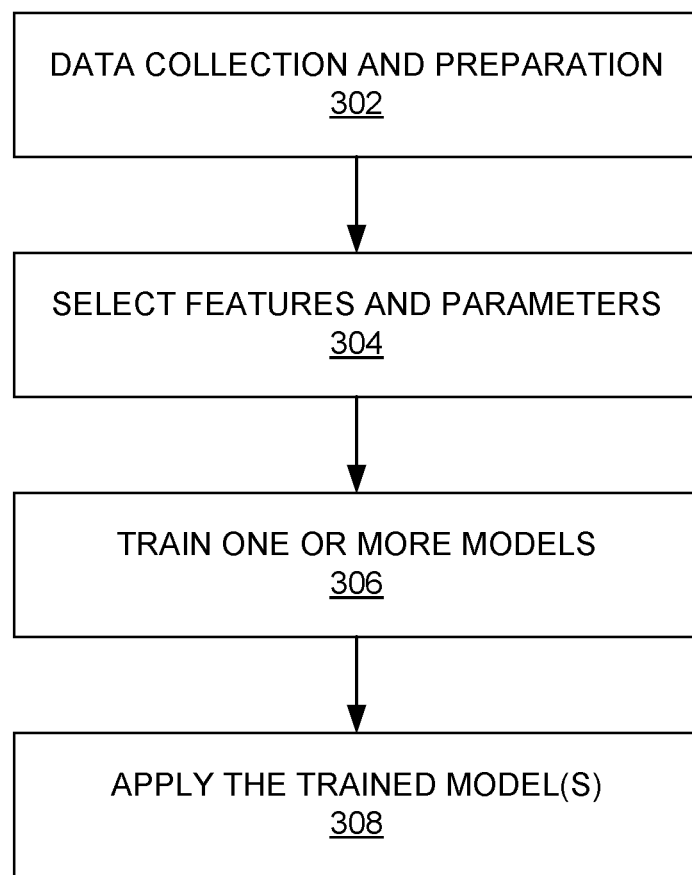
FIG. 3 is a flow chart illustrating an embodiment of a process for supervised machine learning to train one or more prediction models.

Machine learning models may include trained models generated from a machine learning process such as the process of FIG. 3. Trained models may be categorized by type such as sales models, inventory models, variety models, etc. For each category of model, a model may be generated for each of one or more segments such as segments based on one or more of the following: a target body type, a target seasonality, a target fiscal quarter, a target customer type or business line (e.g., women, men, children), a target lifestyle, a target product type (e.g., blouse, dress, pants), a target style (e.g., edgy, urban, Pacific Northwest), etc. A model may correspond to a particular segment such as a client segment, time period, etc. For example, a first sales model may be for the sales performance of a product for a group of customers with a first body type such as petite and a second sales model may be for the performance of a product for a group of customers with a second body type such as tall.

In some embodiments, a machine learning trained sales model can be utilized to predict a sales of a product with features indicated to the model. The sales model may be trained using past sales data.

In some embodiments, a machine learning trained inventory model can be utilized to predict an inventory metric associated with a product with features indicated to the model. The inventory model may be trained using sales data, current inventory information, past inventory information, etc.

In some embodiments, a machine learning trained variety model can be utilized to predict a likelihood of whether a product with features indicated to the model would be desirable to add to an inventory of product offerings to achieve an ideal distribution of inventory variety.

In one aspect, the variety model may be used to identify the value of variety in the inventory even where exactly who the style is for is typically not identifiable. The variety model may measure a product in terms of the product globally filling a need. The variety model may help expand total addressable market. That is, even if a product does not perform well with a current customer, the product may perform well with potential/future customers. In another aspect, a customer may prefer having more color choices even if he or she tends to purchase only one color. The customer might like the increased possibility that he or she is purchasing a unique blouse in his or her color because the blouse is offered in many color choices. The variety model may be trained using higher level indications of desired distribution of inventory variety. For example, machine learning training may have to be utilized to determine a higher level model for ideal inventory distribution based on higher level product categories, and the variety model is trained using this higher level model to determine a model for ideal inventory distribution based on product features. For example, a particular blouse style may be offered in three colors. Although one of the colors may not sell as well as the other two colors, providing the third color as an option may represent value in the inventory In various embodiments, other models may be utilized. Example models include models for style rating, size rating, fit rating, quality rating, retention, personalization, style grouping, and price value rating as further described herein with respect to FIG. 2.

The design tool 208 may be configured to employ adaptive machine learning to help a designer design items for the customers according to the customers' tastes. The designed items, which may be a hybrid of a base option and one or more features, may be among the items that a stylist can choose to offer to a customer. The design tool may be configured to execute the processes described herein to design a product, where the product incorporates predicted successful features selected to meet an optimization goal, as further described herein. For example, a designer may use the design tool 208 to create a product. The selection of one or more features that make up a product may be based on an optimization goal such as increasing a sales rate (e.g., measured by units sold), selection rate (e.g., measured by frequency of selection to be offered for sale), appeal to a particular market segment, performance for a particular season or quarter, etc., as further described herein. Thus, the product may be a result of a combination of machine learning/artificial intelligence selected alternative features for a base option, where the alternative features are those features automatically determined to be among the best options to meet an optimization goal. For example, the alternative features may be ranked according to how well each alternative feature meets the goal and the ten best features (or other threshold number) may be selected and presented for use as replacement or additional features for a base option to create a product. In other words, a product is a base option combined with one or more alternative features or combinations of alternative features.

Figure 4:
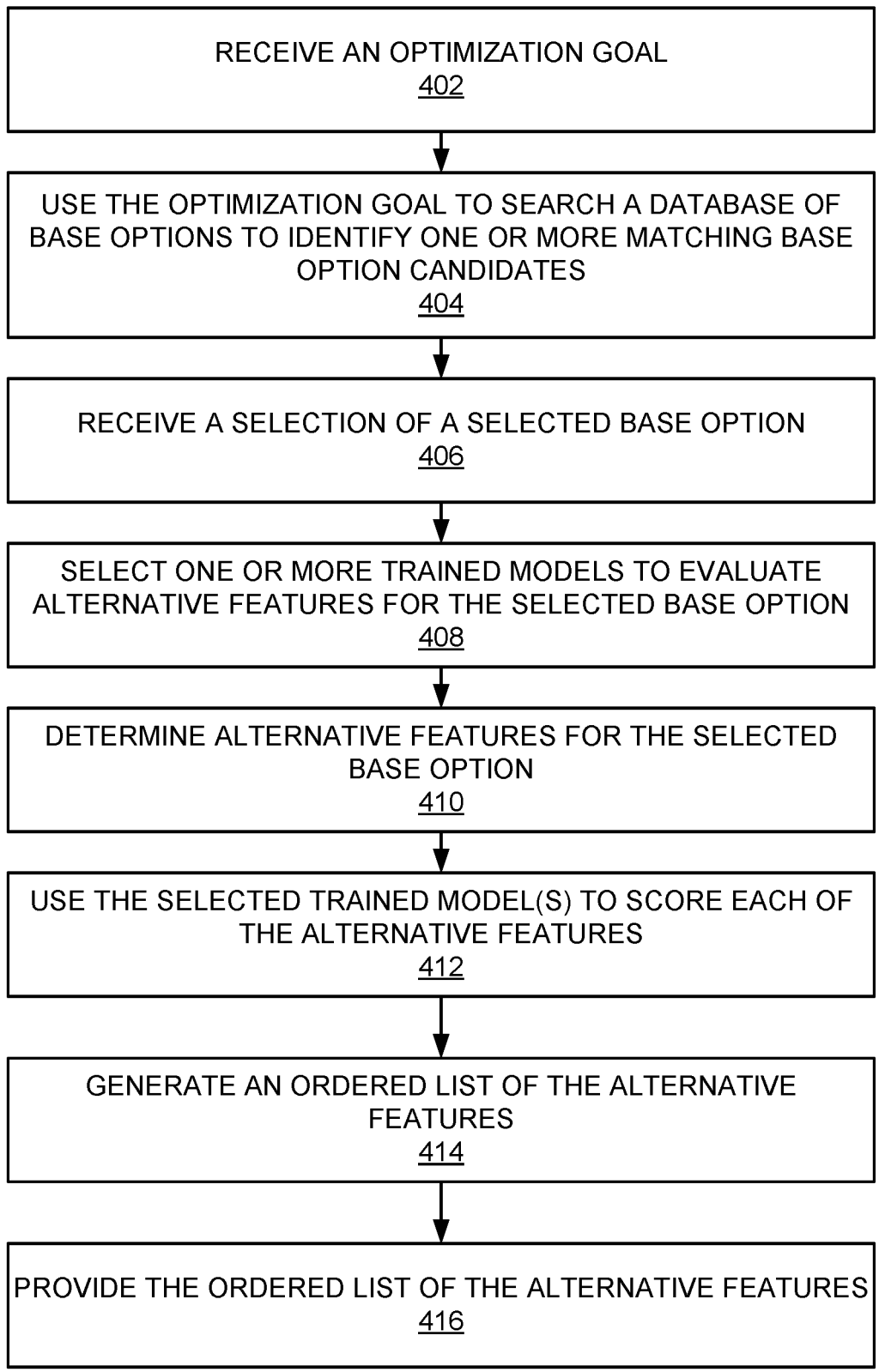
FIG. 4 is a flow chart illustrating an embodiment of a process of computer generated design of a product including base option determination and feature determination.
Figure 5:
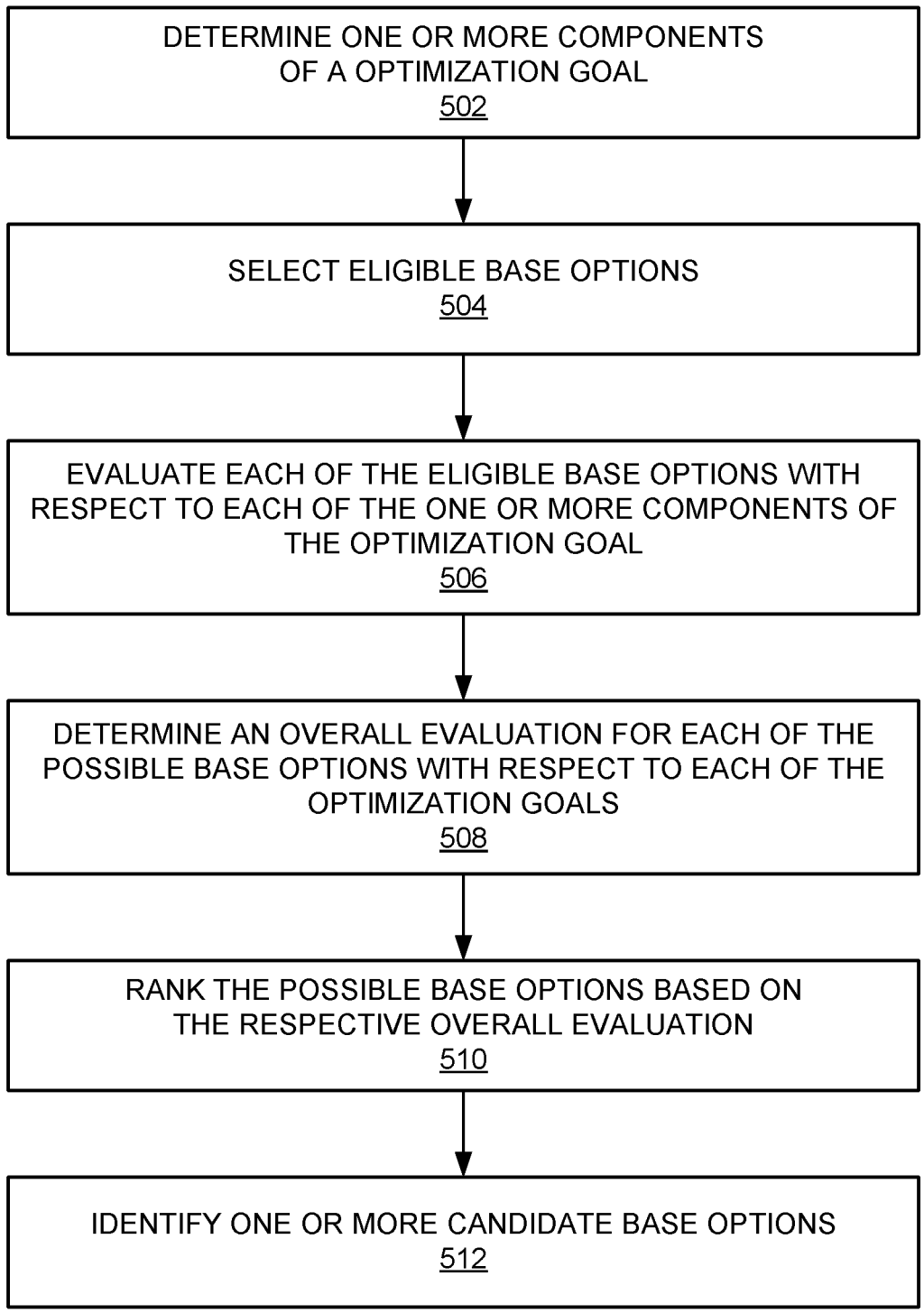
FIG. 5 is a flow chart illustrating an embodiment of a process for identifying base options.
Figure 6:
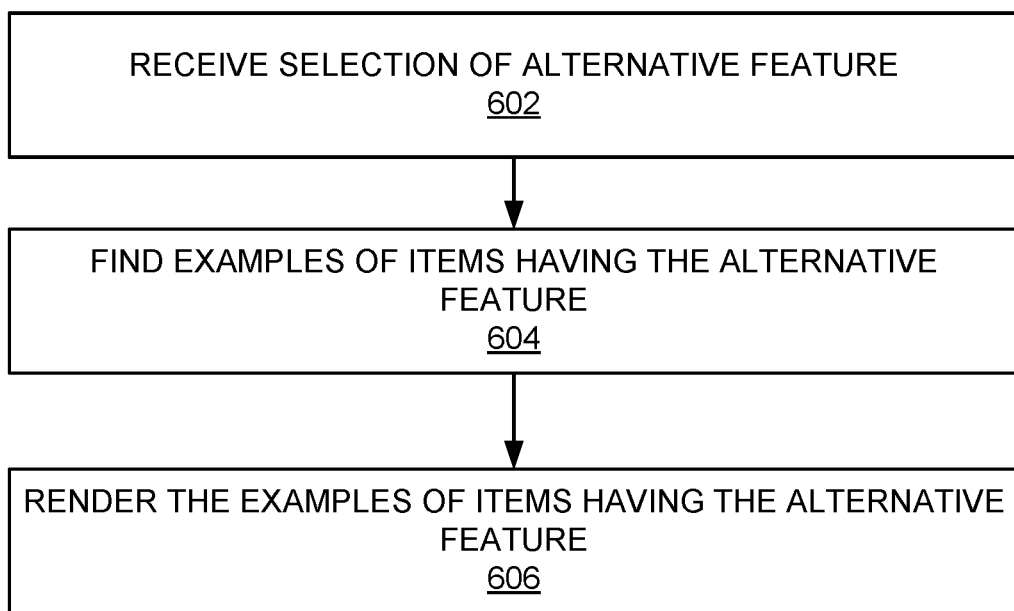
FIG. 6 is a flow chart illustrating an embodiment of a process to render example products containing alternative features.

In various embodiments, the design tool may be configured to perform the processes described herein, e.g., the processes shown in FIGS. 4-6, to design a product. The design tool 208 may receive input, automatically make design recommendations using machine learning/artificial intelligence, and generate output design specifications. The output of the design tool may be provided to a supplier to manufacture a product according to the specifications of the output.

For example, to at least in part automatically design a product, a system aggregates data collected from a customer, stylist, and/or designer. The data platform may build one or more trained models using machine learning processes further described herein. The training data to train the models may be based on behavior of the customer, stylist, and/or the designer as stored over time in the customer database, recommendations database, and/or inventory database. When a designer provides an optimization goal via the design tool, one or more base options are selected by the system and provided to the designer. The designer may select one of the base options. In response, the system may utilize the models to automatically identify one or more alternative features (or combinations of alternative features) for the base option. The base option may be modified or augmented based on the alternative features. For example, if the base option is a blouse, an alternative feature may identify a replacement or type of neckline, sleeve length, hem length, or the like. The base option may also be automatically selected by the system based on the processes described herein, e.g., the process of FIG. 5.

FIG. 3 is a flow chart illustrating an embodiment of a process for supervised machine learning to train one or more prediction models. The process of FIG. 3 may be at least in part implemented on one or more components of system 200 shown in FIG. 2. In some embodiments, the process of FIG. 3 is performed by processor 1702 of FIG. 17. In some embodiments, a designer interacts with the process of FIG. 3 using GUI 700 of FIG. 7.

At 302, training data is collected and prepared. In supervised machine learning, training data may be utilized to train a prediction model to perform predictions based on information "learned" from the training data. The collected data may also include validation data to verify the accuracy of the trained prediction model.

The training data may be derived from data about items stored in database 206 of FIG. 2. Different prediction models can be trained for different prediction model categories or segments. To train each of the different models, different sets of training data can be gathered specifically for different models to be trained. For example, past performance data associated with a metric to be predicted using a particular type of model is gathered for various different segments, and different models of the particular type may be trained for each of the various different segment combinations.

Trained models to be generated may be categorized by type such as sales models, inventory models, variety models, rating models, etc. For each category of a model, a model may be generated for each of one or more client segments such as segments based on one or more of the following: a target body type, a target seasonality, a target fiscal quarter, a target customer type or business line (e.g., women, men, children), a target lifestyle, a target style (e.g., edgy, urban, pacific northwest) a target product type (e.g., blouse, dress, pants), etc.

In some embodiments, a prediction model of a sales model type can be utilized to predict a success or sales of a product with features indicated to the model. Training data gathered to train sales type models includes data associated with past sales performance of products and associated information about the particular products (e.g., features of the products) and the particular sales.

In some embodiments, a prediction model of an inventory model type can be utilized to predict a likelihood of whether a product with features indicated to the model will be ultimately offered to a customer. Training data gathered to train inventory type models includes data associated with past selection performance (e.g., selection rate by a stylist) of products and associated information about the particular products (e.g., features of the products) and the particular selections.

In some embodiments, a prediction model of a variety model type (can be utilized to predict a likelihood of whether a product with features indicated to the model would be desirable to add to an inventory of product offerings to achieve an ideal distribution of inventory variety. Training data gathered to train variety type models includes data associated with higher level indications of desired distribution of inventory variety. For example, machine learning training may be utilized to determine a higher level model for ideal inventory distribution based on higher level product categories, and the variety model is trained using this higher level model to determine a model for ideal inventory distribution based on product features.

At 304, supervised machine learning features and parameters are selected. For example, a user may set control parameters for various machine algorithms to be used to train a model. The selection of the features refers to the selection of machine learning features or individual identifiable properties of an item. The features and parameters may be selected based on objectives for the trained model. Examples of features for a garment product include type (e.g., blouse, dress, pants), silhouette (e.g., a shape of the garment), print (e.g., a pattern on a fabric), material, hemline, sleeve, etc. Examples of features are described with respect to FIG. 8. Identification of features may be received.

The selection of features to be utilized in prediction models can be defined at least in part by a human user or at least in part by automatically being determined. For example, a human or artificial intelligence may define features of the prediction models to be trained.

In various embodiments, the features may be based at least in part on natural language processing (NLP). For example, a computer system may extract information from text according to NLP techniques. Text generated by and about customers such as in product reviews, comment forms, social media, emails, and the like may be analyzed by an NLP system to determine customer preferences. For example, a customer may provide feedback (e.g., text) when they receive an item (e.g., 112 of FIG. 2). The feedback provided by the customer may be processed with NLP techniques to extract features. NLP techniques include rule-based engines, clustering, and classification to make determinations about characteristics of a product that might be considered a feature. Features may be identified by machine learning or computer vision or NLP, and recommended for inclusion in a product design. In various embodiments, term frequency-inverse document frequency (TFIDF), latent Dirichlet allocation (LDA), colocation analyses, and the like can be used to create lower-dimensional representations of styles or to generate words or phrases representing styles. Various machine learning methods can then predict metrics/optimization goals using these features. Features that predict the optimization goal can then be related back to representative styles to communicate the concept to designers and/or manufacturers.

In various embodiments, the features may be selected based at least in part on computer vision. For example, information about items (such as items stored in database 206) may have image representations. A computer system may extract information from images or videos of the information about items according to computer vision techniques. Computer vision systems may recognize objects, object properties, commonalities, or generalizations about groups of objects to identify patterns and features of objects. Here, computer vision systems may recognize common attributes between items and identify them as features. Computer vision systems may identify a feature of a product that is not describable by a human. Using the example of a fabric, a computer vision system may identify a particular print that a human might not recognize as being in common between two garments. In some embodiments, a computer vision system may allow quantification of the distance between styles of various prints. In various embodiments, features can be discovered by creating unique cluster spaces using color values. The color values can be created by edge detection and defining print scale and contrast. Edge detection may be used to provide distance metrics between styles by quantifying "busyness" of a pattern. In some embodiments, the color values can be defined by using neural networks, convolution, etc. In some embodiments, the color values can be extracted from data of an image without neural networks. For example, an optimization goal may be predicted using latent dimensions and/or principal components of the latent dimensions or clusters (k-means) within those dimensions. In various embodiments, features may be based at least in part on neural nets. An optimization goal may be predicted using numeric color descriptions of color labels arising from clustering within RGB or LAB color space.

At 306, one or more models are trained. The trained model may predict/determine performance of a product having a set of features provided as input to the trained model. Trained models may be categorized by type such as sales models, inventory models, variety models, rating models, etc. For each category of models, a model may be generated for one or more segments. For example, a trained model may receive as input a feature or combination of features and predict/score a performance metric such as sales metric, inventory metric, variety metric, style rating, size rating, fit rating, quality rating, retention, personalization, style grouping, and price value rating.

In various embodiments, a plurality of models are trained and each model corresponds to a respective performance metric. For example, a sales model is trained to determine a sales metric, an inventory model is trained to determine an inventory metric, an inventory model is trained to determine an inventory metric, and rating models may be used to determine style rating, size rating, fit rating, quality rating, retention, personalization, style grouping, and price value rating. The models may be trained with training data sets, where the training data sets correspond to particular categories and segments.

A sales model may score input with respect to the input's sales metric. The sales model may be utilized to predict what features will have a high sales metric rate. For example, training sales models can include information about past sales of products in which the features of the products are known. An inventory model may score input with respect to the input's inventory metric. The inventory model may predict the likelihood of a feature to be offered to a customer. A variety model may score input with respect to its value in providing variety or diversity to inventory. A rating model may score input with respect to its predicted rating. A model may be specialized for a particular segment by training with data for only that segment. For example, the model for a particular segment may predict whether a particular combination of features will sell well for customers of a specific client segment.

The model may be trained according to supervised learning or other machine learning techniques. In supervised learning, the objective is to determine a weight of a feature in a function that optimizes a desired result, where the function is a representation of the relationship between the features. In a training process, weights associated with features of a model are determined via the training. That is, the contribution of each feature to a predicted outcome of the combination of features is determined. In various embodiments, the model may be trained using mixed effects models that take into account several features, some of which may be non-independent. The model may be trained by ridge regression that attributes credit to a particular feature.

In some embodiments, when training a model, the attribution of each feature to the output of the function is determined. In some embodiments, a feature represents a combination of features. For example, an individual feature may have a different weighting when that feature is combined with another feature. A feature or set of features may define a base option. As more input is provided to a model, the output of the function becomes closer to a target or validation result.

In various embodiments, a model may be evaluated after the model has been trained. The error of a model is the difference between actual performance and modeled performance. In another aspect, in some situations, a well-trained model may nevertheless diverge from an actual result. In this situation, a product may have an aspect that makes the product perform better than expected. For example, the product may perform better than predicted by a trained model. The description of the factor for success is an aspect.

This aspect can be leveraged by incorporating the aspect into products as further described herein.

As a result of training, a trained sales/success model may predict the performance/success of a set of features combined in a product. For example, given two sets of features differing only in color, the model may predict that the success is attributable to the difference in the color feature. Because the trained model is able to attribute success to a particular alternative feature or combination of alternative features, the predictions by the trained model may be used to identify alternative features to be included in a product to best match the optimization goal.

At 308, the trained model(s) are applied. The trained model(s) may be applied to make a recommendation about features to include in a design of a product. Thus, the trained model(s) may recommend one or more alternative features to augment a base option (e.g., existing product utilized as a design starting point). That is, a product includes one or more attributes of features identified as desirable to be included in the product using the trained model. As further described herein, the trained model may be used to make a recommendation about one or more base options. For example, a search space of base options may be explored to select base options that perform well (e.g., according to an optimization goal) using the trained models. A result of a trained model may be weighted and combined with a weighted result of the other trained models to rank alternative features.

FIG. 4 is a flow chart illustrating an embodiment of a process of computer generated design of a product including base option determination and feature determination. The process of FIG. 4 may be at least in part implemented on one or more components of system 200 shown in FIG. 2. In some embodiments, the process of FIG. 4 is performed by processor 1702 of FIG. 17. In some embodiments, a designer interacts with the process of FIG. 4 using GUI 700 of FIG. 7.

At 402, an optimization goal is received. The optimization goal may describe the design goal and/or performance goal for a product. The optimization goal describes a target result (e.g., design element or performance) desired to be achieved by a product, and may be used as a basis to evaluate base options and/or alternative features. An example of an optimization goal is 860 of FIG. 8. In some embodiments, an example of a performance goal is "designing a new product that will be commercially successful for customers in a segment for use in the winter season." An example of a design goal is one or more features that must be included in the design of a product such as "designing a new product that incorporates polka dots."

An optimization goal may include one or more goal components. In some embodiments, the goal components may identify one or more features such as color, print, sleeve length, hem length, etc. In some embodiments, the goal components may identify one or more optimization types such as sales metric (e.g., goal of designing a product predicted to achieve the highest sales), inventory metric (e.g., goal of designing a product predicted to achieve highest selection rate for presentation to customers), variety metric (e.g., goal of designing a product predicted to optimize a distribution of products in an inventory), style rating, size rating, fit rating, quality rating, retention, personalization, style grouping, and price value rating, and the like. The goal components may have target segments. In various embodiments, target segments refer to current segments and/or future segments or areas in which to expand. Example target segments include target business line (e.g., women, men, children), target product type (e.g., blouse, dress, pants), client segment, seasonality (e.g., Spring/Summer, Fall/Winter), etc. The optimization goal may be evaluated for segments of an optimization type, e.g., optimizes sales for target customers of a certain client segment and in a target product season. The optimization goal may be received via a GUI such as GUI 700 of FIG. 7.

In various embodiments, one or more goal components may be provided by a user. For example, the user may select from among several goal component options. In various embodiments, one or more goal components may be determined by parsing a string. For example, the optimization goal may be entered by a user in an input text box.

At 404, the optimization goal is used to identify one or more base option candidates from among possible base options. In some embodiments, base option candidates are presented to a user/designer in a ranked order associated with their desirability with respect to the optimization goal. The base option candidates may be selected from among base options in: a catalog of products (e.g., the products may be available from a supplier or may have been previously offered to a customer), a group of human-curated base options, and/or a machine-selected group of base options. In various embodiments, a base option candidate is an item that was available for sale. For example, the base option candidate may be selected based on sales data for the item that was previously sold. The base option candidate may be selected because the item sold well for a particular segment identified in the optimization goal. In various embodiments, a base option candidate is determined based on past performance data associated with each of the base option candidates. For example, a ranked list of best sellers for a given product segment may be used to select one or more of the best sellers for inclusion in a list of base option candidates (e.g., the three best-selling blouses for under $25 may be identified as base option candidates).

In various embodiments, a base option candidate is determined by evaluating a divergence between actual performance (e.g., as measured by sales data) and predicted performance of the base option as a product. The predicted performance of the base option may be determined from one or more trained models such as a model trained by the process of FIG. 3. Suppose a product performs better than expected (e.g., as expected according to a trained model trained by machine learning such as the process of FIG. 3). This difference between actual and predicted performance may be scored and scores associated with different base options candidates may be used to rank and sort the base option candidates to aid in the selection of the best base option. For example, a product may score higher if the divergence between the actual and predicted performance is positively larger. For example, the product may be ranked higher because some aspect of the product caused the product to actually perform better than predicted.

By using the scoring of divergence of a product that performed better than predicted by a trained model, aspects of the product that made it successful may be incorporated into a product by using the attribution/feature causing the divergence between the actual performance and the predicted performance. The divergence between the actual performance and predicted performance accounts for unspecified features that cause the product to perform better than predicted, and unspecified features are not accounted for by models. A larger divergence value indicates that the product has an attribute that the prediction models were unable to effectively model. By selecting the base option with the largest positive divergence between actual and predicted performance as the basis for a product design, the product design incorporates positive attributes of the base option that were unable to be effectively modeled by the prediction models.

Additional example details with respect to selection of a base option are provided along with FIG. 5.

Figure 7:
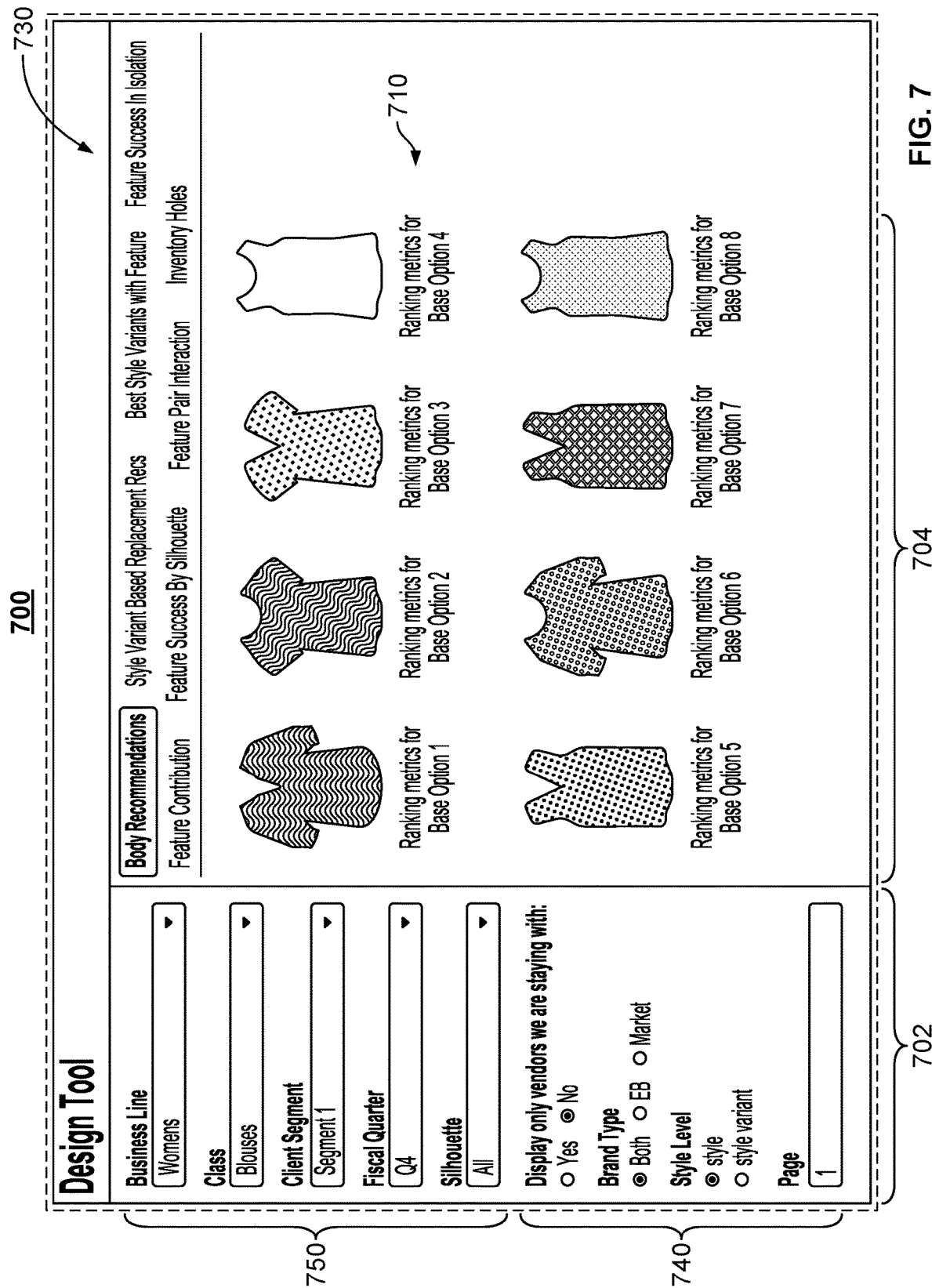
FIG. 7 is an example of a GUI for generating a design of a product.
Figure 11:
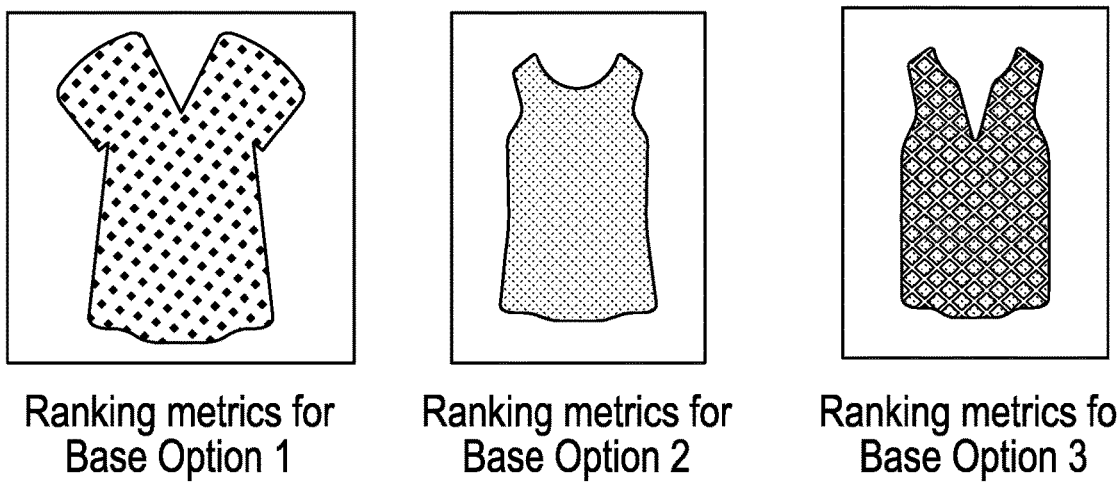
FIG. 11 is an example of a GUI for displaying one or more base options and receiving a selection of a base option for generating a product.

At 406, a selection of a selected base option is received. The base option may be defined by a set of one or more features. The selection may be made by a designer/user. For example, a user may select the base option via a GUI to serve as a basis of a product design. Example GUIs for providing base option candidates and receiving a selection are shown in FIGS. 7 and 11.

At 408, one or more trained models to evaluate alternative features for the selected base option are selected. The trained model(s) may be selected based at least in part on the optimization goal and/or the selected base option. That is, one or more machine learning prediction models (also referred to as "trained models") may be selected based at least in part on the optimization goal to determine prediction values associated with alternative features for the selected base option. The one or more machine learning prediction models may have been trained using training data to at least identify machine learning weight values associated with the alternative features for the one or more machine learning prediction models, e.g., according to 306 of FIG. 3.

The trained models may be selected to limit the number of trained models used because using more models increases processing time. The trained models most relevant to the optimization goal and/or base option may be selected to maximize prediction accuracy while reducing processing time. In various embodiments, a particular category of trained model (e.g., sales, inventory, or variety) may be selected based at least in part on the optimization type. In various embodiments, a particular segment may be selected based at least in part on the optimization goal component. Depending on the optimization goal, a prediction/result of a trained model may be weighted and weights associated with different models are determined. For example, the prediction results of different trained models may be weighted and combined to determine an overall prediction value that can be used as a basis to rank alternative features.

At 410, eligible alternative features are identified for the selected base option. The eligible alternative features may be selected by a user and/or automatically determined. For example, among all possible features of a prediction model (e.g., features determined in 304 of FIG. 3), a subset of features applicable and eligible for inclusion in the base option as replacements or additional features are identified. In some embodiments, the features eligible for the selected base option may be selected according to manually specified rules or machine learned models. The eligible features include features that can be added or replaced given the already existing features of the selected base option. For example, if a base option is a skirt, the eligible features may include length, silhouette, and fabric. Features such as sleeve and neckline would not be selected because they do not apply to skirts.

At 412, the selected trained model(s) are used to score one or more sets of features. For example, a set of features may be made up of the features of a base option and at least one of the alternative features, where the alternative feature replaces one of the features of the base option or is added to the set of features of the base option. As another example, a set of features may be made up of the features of a base option and a plurality of the alternative features, where the plurality of alternative features replaces some of the features of the base option or are added to the set of features of the base option. In various embodiments, a model trained according to the process of FIG. 3 takes the set of features and outputs a predicted score of the set of features. The model may be used for all possible combinations of alternative features with the base option to generate predictions for each of the combinations. Because machine learned weights for features are known, a function of the weighted features generates an output representing a prediction about the combination of features making up a product. Using the output about the combination of features, the combination of features may be ranked. Correspondingly, individual alternative features or combinations of alternative features may be ranked. In various embodiments, more than one trained model is utilized. For example, a result of each of the selected trained models may be weighted and a combination of weighted results of several trained models is determined as a total score for an alternative feature or combination of features.

At 414, an ordered list of the alternative features is generated. In various embodiments, the ordered list may be generated based on the prediction values by sorting at least a portion of the alternative features to generate an ordered list of at least the portion of the alternative features for the selected base option. Values (e.g., scores) associated with desirability of the different alternative features for the selected base option with respect to the optimization goal determined in 412 are sorted and ranked and the corresponding alternative features are provided in an order list of recommendations (e.g., from best to worst) of alternative features to be utilized to modify the design of the selected base option. For example, the top ten scoring alternative features or combination of alternative features may be output in a ranked list. This information may be used to design a product, e.g., by incorporating at least some of the features to a base option.

At 416, the ordered list of alternative features is provided. The ordered list of alternative features allows a designer or computer processor to make modifications to the base option and generate a product. The alternative features may be ordered according to their effects on a prediction result. For example, a highly influential feature may be ranked higher than a less influential feature. If an optimization goal is sales metric, the alternative features may be ranked according to how much they would increase sales of a product should they be incorporated into a product.

In various embodiments, when an alternative feature is selected for inclusion in a product design, examples of already existing products with that alternative feature that best meet the indicated optimization goal may be identified and displayed. For example, because there may be subtle variations in how to implement a particular feature (e.g., type of stripe pattern), recommendations on exact feature implementations are provided by locating best goal optimizing examples. An example process is shown in FIG. 6.

In various embodiments, a first alternative feature may be selected for incorporation into a base option. Upon incorporation, the ordered list of alternative features may be re-generated to reflect updates to the ranking of alternative features. For example, 406-414 may be repeated where the base option is the base option with the incorporation of the selected alternative feature(s). This may yield a sub-set or different set of alternative features for incorporation into the base option with the first incorporated alternative feature. In some embodiments, the ranking of alternative features may change in response to a feature being incorporated into a base option because features may interact with one another to affect the success of a product. That is, a successful feature might not work well with another successful feature such that having both features in a product may make the product less successful. For example, long sleeves may not work well with polka dots. As another example, two features (e.g., long-sleeve and short-sleeve) might not be compatible.

In some embodiments, a designer may select a plurality of alternative features from the provided ordered list for incorporation into a base option to design a product. The resulting product may be input into a trained model to score the product. For example, a designer may select several combinations of features and base options to generate a plurality of products. Each of the products may be scored using the trained model(s). The products may then be compared to each other to determine relative predicted performance.

In various embodiments, a representation of a product may be rendered in response to alternative feature selection for incorporation into a base option. This may help a designer visualize the product. For example, an image of a base option may be altered to show the incorporated alternative feature. The image of the base option may be combined with an image of the incorporated alternative feature. For example, if a three-quarter sleeve is replaced with a long sleeve, a picture of a base option with a three-quarter sleeve may be updated to a picture of a base option with a long sleeve. In various embodiments, the representation of the product may be displayed alongside the base option to allow for comparison. Examples of visual representations of a product are shown in FIGS. 9 and 16.

FIG. 5 is a flow chart illustrating an embodiment of a process for identifying base options. The process of FIG. 5 may be at least in part implemented on one or more components of system 200 shown in FIG. 2. In some embodiments, the process of FIG. 5 is performed by processor 1702 of FIG. 17. In some embodiments, at least a portion of the process of FIG. 5 is included in 404 of FIG. 4.

At 502, one or more components of an optimization goal are determined. The optimization goal may describe the design and/or performance goals for a product. The optimization goal describes a target result (e.g., design element and/or performance) desired to be achieved by a product, and may be used as a basis to evaluate base options and/or alternative features. An example of an optimization goal is 860 of FIG. 8. An optimization goal may include one or more goal components. The goal components may identify one or more optimization types such as sales metric (e.g., goal of designing a product predicted to achieve the highest sales), inventory metric (e.g., goal of designing a product predicted to achieve highest selection rate for presentation to customers), variety metric (e.g., goal of designing a product predicted to optimize a distribution of products in an inventory), style rating, size rating, fit rating, quality rating, retention, personalization, style grouping, price value rating, and the like. The goal components may have target segments such as target business line (e.g., women, men, children), target product type (e.g., blouse, dress, pants), client segment, seasonality (e.g., Spring/Summer, Fall/Winter), etc. The optimization goal may be evaluated for segments of an optimization type, e.g., optimizes sales for target customers of a certain client segment and in a target product season. The optimization goal may be received via a GUI such as GUI 700 of FIG. 7.

The optimization goal allows base options to be compared with each other. For example, "I want to increase profits" may correspond to a goal to increase the sales rate and increase selection rate. In various embodiments, one or more goal components may be provided by a user. For example, the user may select from among several goal component options. In various embodiments, one or more goal components may be determined by parsing a string. For example, the optimization goal may be entered by a user in an input text box.

At 504, eligible base options are selected. The base option candidates may be selected from among base options in: a catalog of products (e.g., the products may be available from a supplier or may have been previously offered to a customer), a group of human-curated base options, a group of one or more sets of one or more features, and/or a machine-selected group of base options. In various embodiments, a base option candidate is an item that was available for sale. For example, the base option candidate may be selected based on sales data for the item that was previously sold. The base option candidate may be selected because the item sold well for a particular segment identified in the optimization goal. In various embodiments, a base option candidate is determined based on past performance data associated with each of the base option candidates. For example, a ranked list of best sellers for a given product segment may be used to select one or more of the best sellers for inclusion in a list of base option candidates (e.g., the three best-selling blouses for under $25 may be identified as base option candidates). In some embodiments, rather than being a specific item that was available for sale, a base option is defined by a set of one or more features. For example, a list of one or more features to be utilized as a starting set of features defines a base option.

Among all possible base options, only base options that meet an identified segment of the optimization goal may be included in the eligible base options. For example, an indicated segment can narrow possible choices for eligible base options. A goal may indicate certain segments and only base options in that segment are selected. Using the example of a segment of an optimization goal to design a blouse for women of a first client segment to be worn in the summer season, only base options identified as blouses are included in the eligible base options.

At 506, each of the eligible base options is evaluated with respect to each of the one or more components of the optimization goal. In various embodiments, a base option is scored based on performance data. For example, the eligible base options may be ranked based on sales data, selection data, and variety data. The performance may be based on historical data and/or a measurement of how close the possible base option actually performed relative to predicted performance. In some embodiments, a prediction result may be made for a base option based on data, formulae, models, and/or calculations. For example, a formula may be selected from a database for a base option to determine an aspect of the base option.

In various embodiments, models cannot completely predict a result because it is a prediction and actual performance may be different. A product may include unspecified features that cause the product to perform better than predicted but the unspecified features are not accounted for by models. If we know a prediction using a model for a particular base option and the actual true past result, we can compare them. If the true result is more desirable, then that can be accounted for by the model not being correct for this product and includes some aspect that cannot be predicted by a model for some reason (the reason cannot be described). This is factored in to identify a product/base option that exhibits positive aspects that cannot be modeled.

In various embodiments, a base option candidate is determined by evaluating a divergence between actual performance (e.g., as measured by sales data) and predicted performance of the base option as a product. The predicted performance of the base option may be determined from one or more trained models such as a model trained by the process of FIG. 3. Suppose a product performs better than expected (e.g., as expected according to a trained model trained by machine learning such as the process of FIG. 3). This difference between actual and predicted performance may be scored and scores associated with different base options candidates may be used to rank and sort the base option candidates to aid in the selection of the best base option. For example, a product may score higher if the divergence between the actual and predicted performance is positively larger. For example, the product may be ranked higher because some aspect of the product caused the product to actually perform better than predicted.

By using the scoring of divergence of a base option product that performed better than predicted by a trained model, aspects of the product that made it successful may be incorporated into a product by using the attribution/feature causing the divergence between the actual performance and the predicted performance. The divergence between the actual performance and predicted performance accounts for unspecified features that cause the product to perform better than predicted, and unspecified features are not accounted for by models. A larger divergence value indicates that the product has an attribute that the prediction models were unable to effectively model. By selecting the base option with the largest positive divergence between actual and predicted performance as the basis for a product design, the product design incorporates positive attributes of the base option that were unable to be effectively modeled by the prediction models.

One or more of these various scores may be used individually and/or weighted and combined.

At 508, an overall evaluation for each of the possible base options is determined. The overall evaluation may be a statically combined aggregation of the score indicators of each of the goal components and/or the score of divergence of a base option that performed better than predicted by a trained model At 510, the eligible base options are ranked based on the respective overall evaluation. The base options may be ranked according to how well they performed as measured by historical data and/or modeling of the base options using one or more trained models. For example, base option candidates are presented to a user/designer in a ranked order associated with their desirability with respect to the optimization goal.

At 512, one or more candidate base options are identified. The candidate base options may be those possible base options scoring above a threshold score. The candidate base options may be the top pre-defined number of possible base options. For example, candidate base options are the top ten possible base options. The candidate base options may be provided on a GUI for selection by a user. Example GUIs displaying candidate base options are the GUIs shown in FIGS. 7 and 11.

FIG. 6 is a flow chart illustrating an embodiment of a process to render example products containing alternative features. The process of FIG. 6 may be at least in part implemented on one or more components of system 200 shown in FIG. 2. In some embodiments, the process of FIG. 6 is performed by processor 1702 of FIG. 17. In some embodiments, at least a portion of the process of FIG. 6 is performed after 416 of FIG. 4.

At 602, a selection of an alternative feature is received. For example, a designer may select an alternative feature presented in a list of alternative features. The alternative features may be provided in 416 of FIG. 4 and provided on a GUI such as GUI 800 of FIG. 8.

At 604, one or more examples of items having the selected alternative feature are identified. In various embodiments, when an alternative feature is selected for inclusion in a product design, examples of already existing products with that alternative feature that best meet an indicated optimization goal may be identified and displayed. For example, because there may be subtle variations in how to implement a particular feature (e.g., type of stripe pattern), recommendations on exact feature implementations are provided by locating best goal optimizing examples. In some embodiments, among all possible example items, only items that meet an identified segment of an optimization goal and also exhibit the selected alternative feature are identified. In some embodiments, each of the identified item examples is evaluated with respect to each of the one or more components of an optimization goal. In various embodiments, an item is scored based on known past performance data with respect to the optimization goal. For example, example items may be ranked based on sales data, selection data, and variety data. In various embodiments, example items are at least in part ranked based on a divergence between an actual performance (e.g., as measured by sales data) associated with an item and a predicted performance of the item as predicted by one or more prediction models trained by the process of FIG. 3.

At 606, examples of items having the alternative feature are provided to a user. For example, the examples are rendered on a GUI such as GUI 900 of FIG. 9.

FIG. 7 is an example of a GUI for generating a design of a product. The GUI 700 may be provided as part of a design tool for designing a product. In some embodiments, GUI 700 is used by a designer to design a product.

GUI 700 includes input fields accepting user input regarding an optimization goal (the input fields are collectively referred to as input section 702), output fields providing one or more responses based on the received input (the output fields are collectively referred to as output section 704), and navigation menu 730. The designer may use the design tool to design a product that meets the optimization goal. For example, the designer may wish to design a garment that is predicted to perform well (e.g., sell well) among a particular client segment.

The input section 702 in this example receives an optimization goal via drop down menus 750. Here, the optimization goal includes components: business line (e.g., women, men, children), product type (e.g., blouses, dressed, pants), client segment, fiscal quarter or seasonality (e.g., Spring/Summer, Fall/Winter), and silhouette (e.g., a shape of the garment). The goal components may be selected via drop-down menus as shown or by other input methods such as text entry, selection of a button, and the like. The goal components may be pre-populated with a default value. Here, default selections are shown: "womens" for business line, "blouses" for class, "Segment 1" for client segment, "Q4" for fiscal quarter, and "all" for silhouette. The goal components are merely examples and other components/options are also possible.

Figure 10:
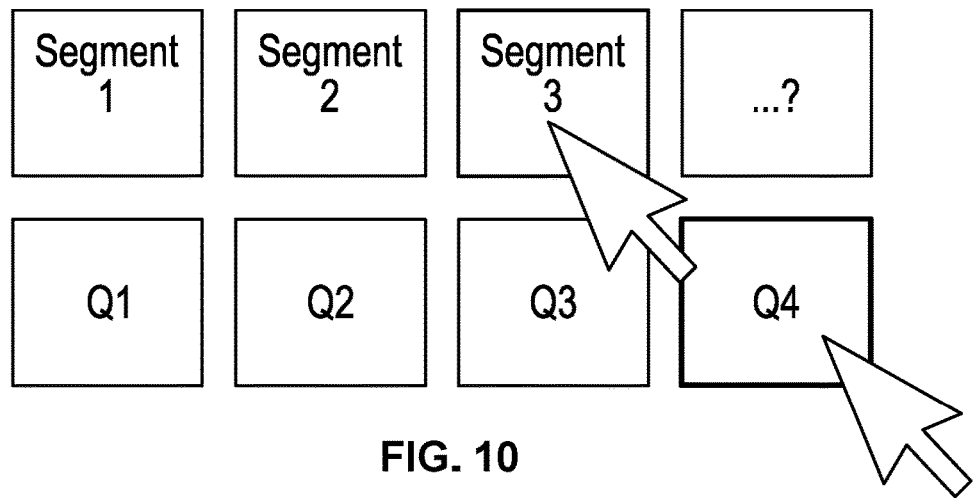
FIG. 10 is an example of a GUI for receiving an optimization goal for generating a product.

In an alternative embodiment, the optimization goal may be indicated by other selection or input methods. FIG. 10 is an example of a GUI for receiving an optimization goal for generating a product. In the example GUI shown in FIG. 10, a user may select a target client segment by clicking on/touching a target client segment ("Under 30," "30-50," or "50 and over"). A user may select a season by clicking on/touching a season ("Q1," "Q2," "Q3," "Q4").

Returning to FIG. 7, the input section 702 in this example includes rendering options 740. The rendering options may determine how output such as base options are displayed in output section 704. Here, rendering options include: whether to display only vendors that we are staying with (e.g., vendors that will be available in the future), brand type (e.g., in-house brands vs. other brands), a style or variants on the style, and the number of pages over which to split results. For example, results may be displayed on a single page or each page may be defined to show a pre-determined number of results.

Figure 8:
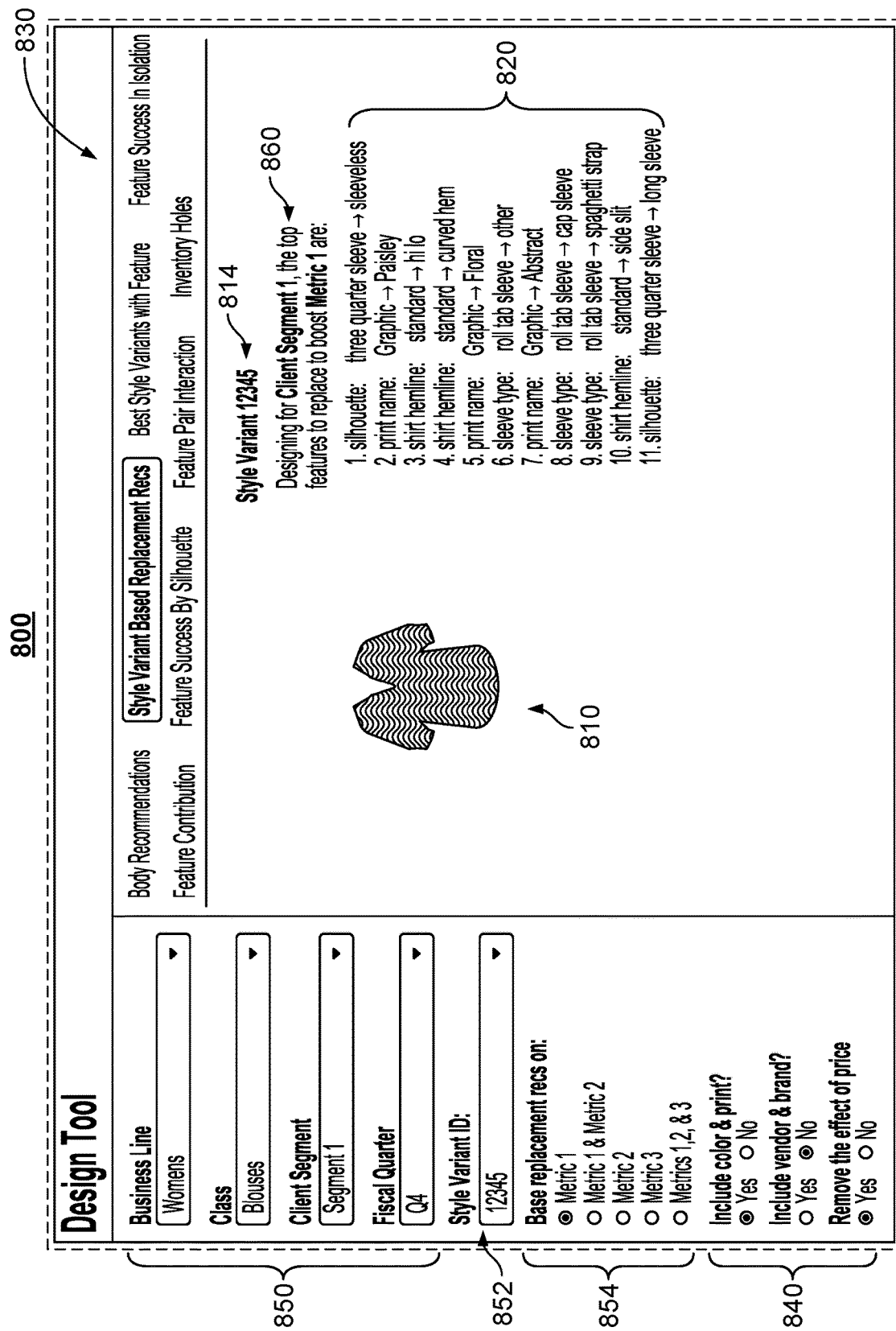
FIG. 8 shows an example GUI of a design tool for generating a design of a product.

The output section 704 in this example includes base options 710 generated from the optimization goal components 750. The base options may be displayed in a ranked order of best matching base options selected based on the optimization goal components 750. In this example, eight base options are displayed. For each base option, associated information such as ranking metrics may be displayed. In various embodiments, a base option may be selected for example when a user clicks on or touches the base option. In response to a user selection of the base option, one or more alternative features may be displayed. An example process for selecting alternative features for a given base option is the process of FIG. 6. In various embodiments, in response to selection of a base option, information corresponding to navigation menu 730 item "Style Variant Based Replacement Recs" is automatically updated. An example of output corresponding to the "Style Variant Based Replacement Recs" is shown in FIG. 8.

In an alternative embodiment, output section 704 includes instructions to select a recommended base option. FIG. 11 is an example of a GUI for displaying one or more base options and receiving a selection of a base option for generating a product. In this example, a user selects a base option in response to a prompt to select a recommended body (base option) for a previously selected client group and time period. The example of FIG. 11 corresponds to FIG. 10, in which target client segment "Segment 3" and season "Q4" are selected.

In various embodiments, the navigation menu 730 allows a user to view various different output generated from the optimization goal. Here, the menu includes: "Body Recommendations" (e.g., base options), "Style Variant Based Replacement Recs" (e.g., alternative features), "Best Style Variants with Feature" (e.g., products), "Feature Success in Isolation," "Feature Contribution," "Feature Success By Silhouette," "Feature Pair Interaction," and "Inventory Holes." In various embodiments, the "Body Recommendations" includes a listing of one or more base options based on an optimization goal. For example, the Body Recommendations may be a result of 404 of FIG. 4. In various embodiments, the "Style Variant Based Replacement Recs" includes a listing of one or more alternative features for a base option selected from the Body Recommendations. For example, the Style Variant Based Replacement Recs may be a result of 414 of FIG. 4. In various embodiments, the "Best Style Variants with Feature" includes a preview of a product based on a selected base option from "Base Recommendations" and one or more alternative features selected from "Style Variant Based Replacement Recs." For example, Best Style Variants with Feature may be rendered after 416 of FIG. 4.

In response to input received via input section 702, output may be rendered in output section 704. Different types of output may be generated based on the input and the information may be grouped and displayed. In various embodiments, a user may navigate between different sections using navigation menu 730. FIG. 7 shows a state of the GUI after input is received at input section 702 and one or more "Body Recommendations" are rendered in output section 704. An example of "Style Variant Based Replacement Recs" rendered in output section 704 is shown in FIG. 8. An example of "Best Style Variants with Feature" rendered in output section 704 is shown in FIG. 9.

FIG. 8 shows an example GUI of a design tool for generating a design of a product. In some embodiments, GUI 800 is used by a designer to design a product. FIG. 8 shows a state of the GUI after input is received at an input section and one or more "Style Variant Based Replacement Recs" are rendered in an output section.

One or more optimization goal components may be selected via drop down menus 850. Here, the optimization goal includes components: business line, class, client segment, and fiscal quarter. An example of optimization goal selection/provision is discussed with respect to the optimization goal components 750 of FIG. 7.

To determine one or more trained models to be used to determine alternative features (e.g., 408 of FIG. 4), input may be received via model selection input 854. The model selection input 854 may be provided by a user. In this example, the options for models are: Metric 1, Metric 1 and Metric 2, Metric 2, Metric 3, and all three metrics (e.g., Metrics 1, 2, and 3). For example, Metric 1 may be a sales model, Metric 2 may be an inventory model, and Metric 3 may be a variety model. Examples of a sales model, an inventory model, and a variety model are discussed with respect to FIG. 4. Although not shown, other models or combinations of models may be used, including but not limited to style rating, size rating, fit rating, quality rating, retention, personalization, style grouping, price value rating, or an aggregate metric. Alternative features may be determined from the selected model(s) by providing one or more optimization goal components to the selected model(s). The trained model(s) may then output one or more alternative features, where the output alternative features best meet the optimization goal. In various embodiments, the number of alternative features may be pre-defined (e.g., the top threshold number of features are output). An example process of selecting alternative features is shown in FIGS. 4 and 6. In other embodiments, other options/combinations of models are possible.

In some embodiments, output is selected for rendering according to ranking options 840. The ranking options 840 may allow users to indicate how results are displayed in a user interface. For example, results of processing by the trained models (selected via model selection input 854) may be processed according to ranking selection via ranking options 840. In this example, a user may select whether to display features with "color & print" and "vendor & brand," and whether to remove the effect of price. The "color & print" option allows the color and print recommendations to be displayed or not displayed. The "vendor & brand" option allows the vendor and brand recommendations to be displayed or not displayed. The "price" options allows a user to consider models that predict what will satisfy the metric overall or to satisfy the metric relative to a price-point at which the garment will be sold.

In response to input received via optimization goal components 850, model selection input 854, and/or ranking options 840, output may be rendered. Different types of output may be generated based on the input and the information may be grouped and displayed. In various embodiments, a user may navigate between different sections using navigation menu 830. The output displayed in this example corresponds to "Style Variant Based Replacement Recs."

In this example, the output includes alternative features 820 for base option 814. Here, the base option is identified by its name "Style Variant 12345" at 852. The alternative features selected for the base option may be based at least in part on an optimization goal. Here, the optimization goal 860 ("Designing for Client Segment 1 and Q4, the top features to replace to boost Metric 1 are") is displayed with the base option 814. The optimization goal 860 is a summary of the components selected via optimization goal components 850. In this example, the alternative features are selected in part based on the selected training model ("Metric 1").

A representation such as an image/photograph, video, or picture of the base option may be displayed. Here, image 810 of the base option "Style Variant 12345" is displayed.

In this example, alternative features 820 includes silhouette, print, hemline, sleeve and type. Each feature may have sub-features. Here, sub-features for silhouette are: three quarter sleeve, sleeveless, and long sleeve. Sub-features for sleeve type are: roll tab sleeve, cap sleeve, spaghetti strap, and other. Sub-features for print are: paisley, floral, and abstract. Sub-features for hemline are: standard, hi lo, curved, and side slit. The alternative features 820 may be listed in an ordered/ranked list. Here, "silhouette: three quarter sleeve→sleeveless" is listed first because altering the silhouette and, more specifically, replacing the three quarter sleeve of the base option with a sleeveless silhouette would boost Metric 1 the most.

FIG. 9 shows an example GUI of a design tool for generating a design of a product. In some embodiments, GUI 900 is used by a designer to design a product. FIG. 9 shows a state of the GUI after input is received at an input section and one or more "Base Style Variants with Feature" having a selected alternative feature or combination of features are rendered in an output section. A "base style variant" refers to a product, which is a product that is a base option with one or more alternative features.

GUI 900 includes alternative features selection section 920 in which a user may indicate the selected alternative feature to add/modify to a base option to produce a product. In this example, the selected alternative feature is alternative feature 7 ("print name: Graphic→Abstract") of alternative features 820 of FIG. 8.

Figure 12:
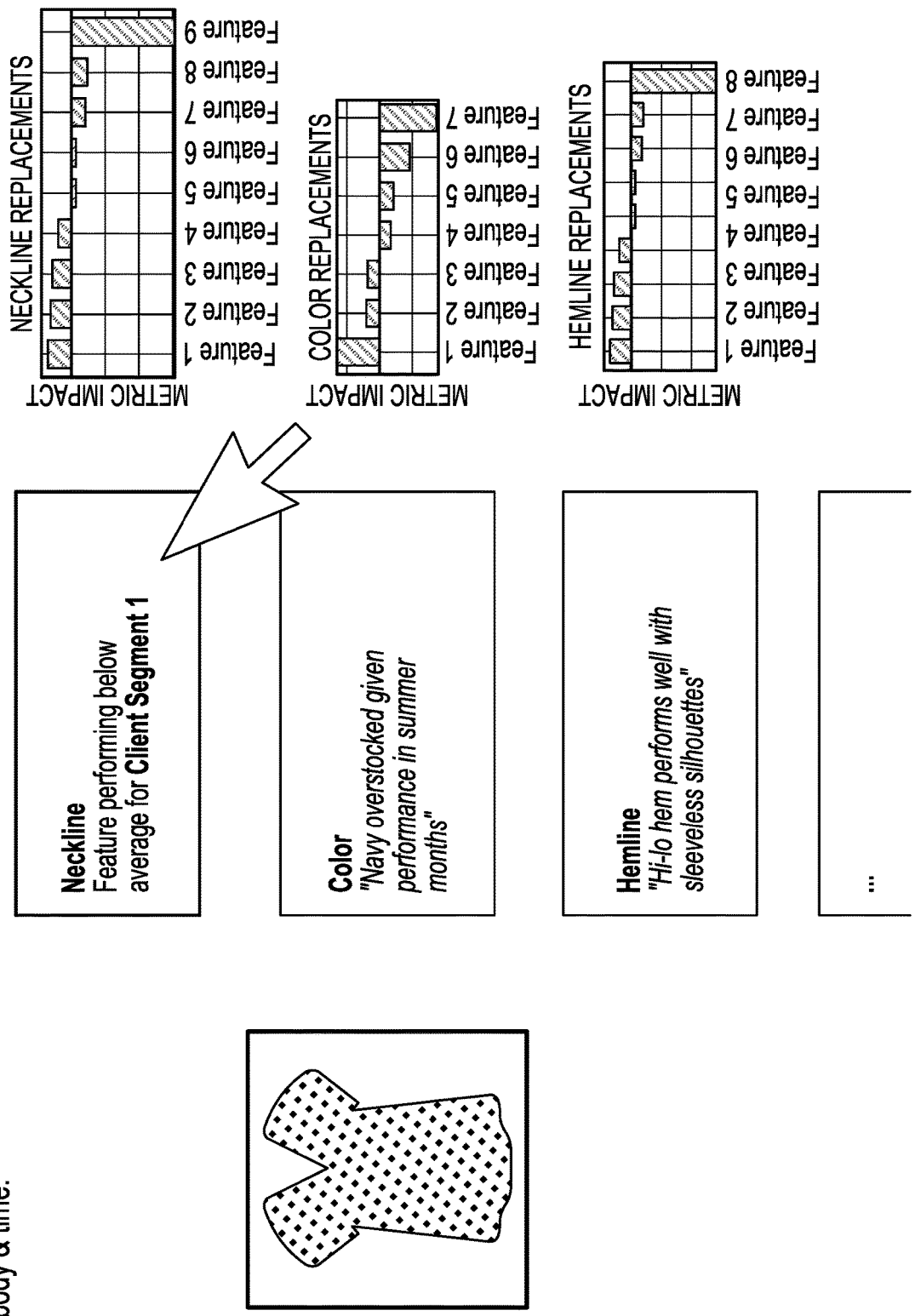
FIG. 12 is an example of a GUI for providing alternative feature selection options and receiving a selection of one or more alternative features for generating a product.

In an alternative embodiment, a user may select one or more alternative features by selecting a button inside of or in addition to using the drop-down menu in features selection section 920. FIG. 12 is an example of a GUI for providing alternative feature selection options and receiving a selection of one or more alternative features for generating a product. In the example of FIG. 12, a user selects "Neckline" as the alternative feature in response to a prompt to select some of the recommended feature mutations (alternative features) tailored to a selected body (base option) and time. Here, the neckline of the base option is a split neck (performing below average for Client Segment 1), the color of the base option is navy (overstocked given performance in summer months), and the hemline is a hi-lo hem (performs well with sleeveless silhouettes). The description for a feature of the base option may be automatically generated based on an assessment of the performance of that feature. Here, the neckline and the color are both underperforming and a reason for underperformance may be provided. For example, the navy was overstocked.

In some embodiments, each alternative feature may be displayed with a corresponding graph of that alternative feature compared with other features of that type. For example, for "Neckline" the graph shows an impact of a metric ("metric impact") of various neckline types (e.g., Feature 1 to Feature 9). Each bar in the bar graph represents a metric impact of a neckline type relative to the selected alternative feature. In some embodiments, the graph may be a basis for a description but not displayed on the GUI as shown.

In various embodiments, an alternative feature may include one or more sub-features. FIG. 13 is an example of a GUI for providing alternative feature selection options and receiving a selection of one or more alternative features for generating a product. In the example of FIG. 13, in response to selecting neckline, additional sub-features are displayed. Here, a ranked list of neckline replacements is displayed (e.g., Neckline A, Neckline B, Neckline C). The user selects "Neckline B" to replace the neckline of the base option with neckline of type Neckline B.

Figure 14:
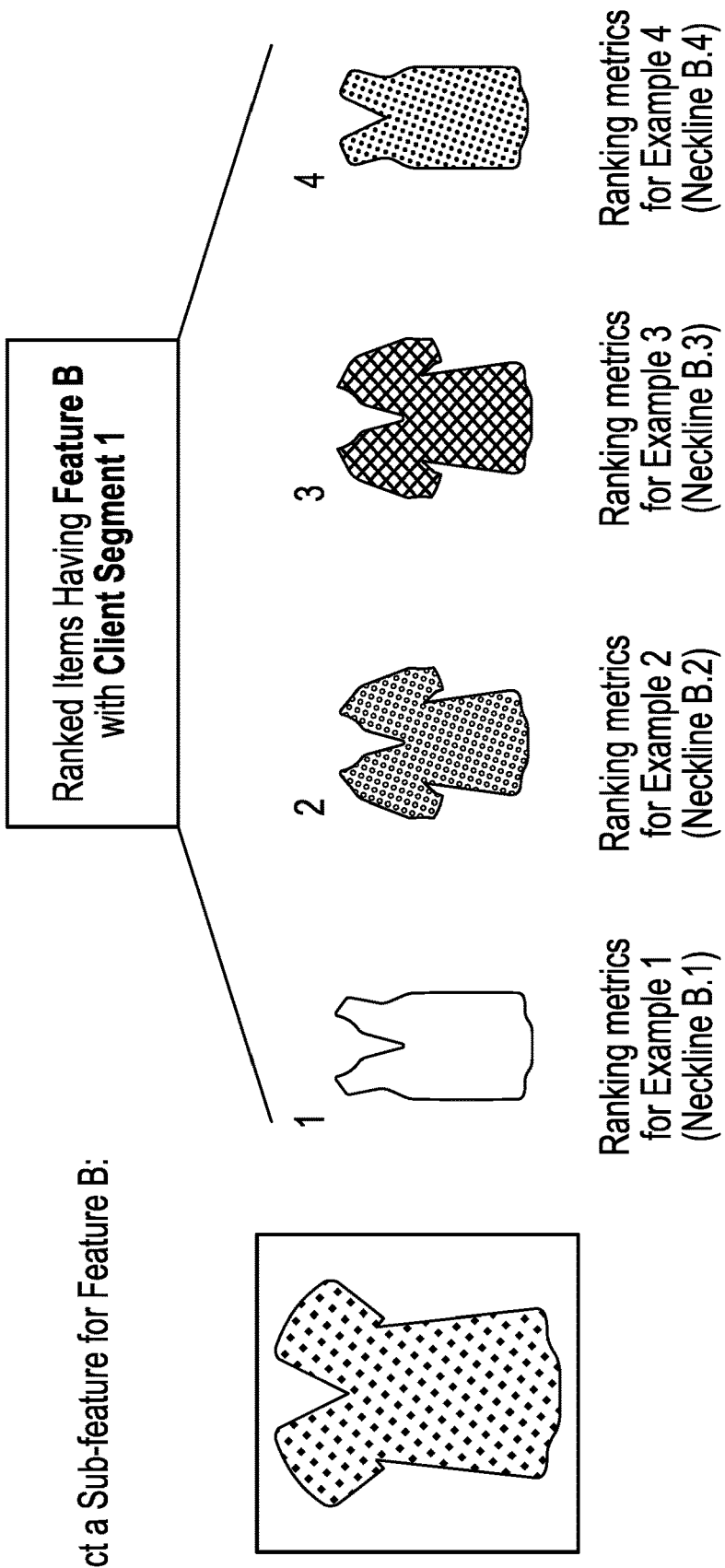
FIG. 14 is an example of a GUI for providing sub-feature feature selection options and receiving a selection of one or more sub-features for generating a product.

In various embodiments, an alternative feature may include one or more sub-features. Sub-features are categorizations of features made at a finer granularity. FIG. 14 is an example of a GUI for providing sub-feature feature selection options and receiving a selection of one or more sub-features for generating a product. In the example of FIG. 14, four blouses with V-neck necklines are displayed. The visual representation of the sub-features may help a designer to visualize the sub-features. Here, the user selects option 2, the neckline (e.g., Neckline B.2) corresponding to Example 2.

Returning to FIG. 9, GUI 900 includes manufacturing options section 940. Here, the manufacturing options include a brand type selection (both "EB," an example in-house brand, and "market," which refers to typical market brands) and a minimum number of shipments. The manufacturing options may be used to filter out products. For example, suppose a particular fabric supplier requires a minimum order exceeding what would correspond to 25 shipments. Abstract fabric from that supplier would be filtered out and any products using that abstract pattern are not to be displayed in section 960.

In response to input received via alternative features selection section 920 and manufacturing options section 940, output may be rendered. Different types of output may be generated based on the input and the information may be grouped and displayed. In various embodiments, a user may navigate between different sections using navigation menu 930. The output displayed in this example corresponds to "Base Style Variants with Feature."

In this example, the base style variants are generated from the combination of base option 814 (corresponding image 810) of FIG. 8 and alternative feature 2 ("print name: Graphic→Abstract") of alternative features 820. That is, a product is base option 814 having the alternative feature of abstract print. Here, eight example products 960, each being the base option 814 with abstract print, are displayed. Additional example products may be displayed on other pages or when a user scrolls down. These example products may be selected from a database of products. In various embodiments, the example products are sorted by optimization goal and displayed in ranked order.

In various embodiments, a preview of a product may be updated in real time as alternative features or combinations of features are selected to be incorporated into a base option or product. FIG. 16 is an example of a GUI for generating a preview of a product. In this example, the product preview 1610 is rendered based on selections of various features. Here, the alternative features are neckline 1620, sleeve 1630, and fabric 1640. Each of these alternative features also has sub-features as shown. In this example, sub-feature 1622 is selected, sub-feature 1632 is selected, and a combination of sub-features 1642 and 1644 are selected.

In various embodiments, a generated product may be described by a design sheet having specifications for manufacturing the product. For example, a design sheet of a product may be generated by the process shown in FIG. 4. The design sheet may be provided directly to the manufacturer to produce the product. FIG. 15 is an example of a design sheet associated with a computer-generated product. In the example of FIG. 15, the product is a blouse with the body of SVID 00000, the neckline of SVID 00001, and the hemline of SVID 00002. In addition, designer notes may be provided. In this example, the notes reflect the optimization goals (Client Segment 1 and over for Q4). In various embodiments, the design sheet may include a visual representation of the product (not shown). FIG. 16 is an example of a visual representation of a product.

Figure 17:
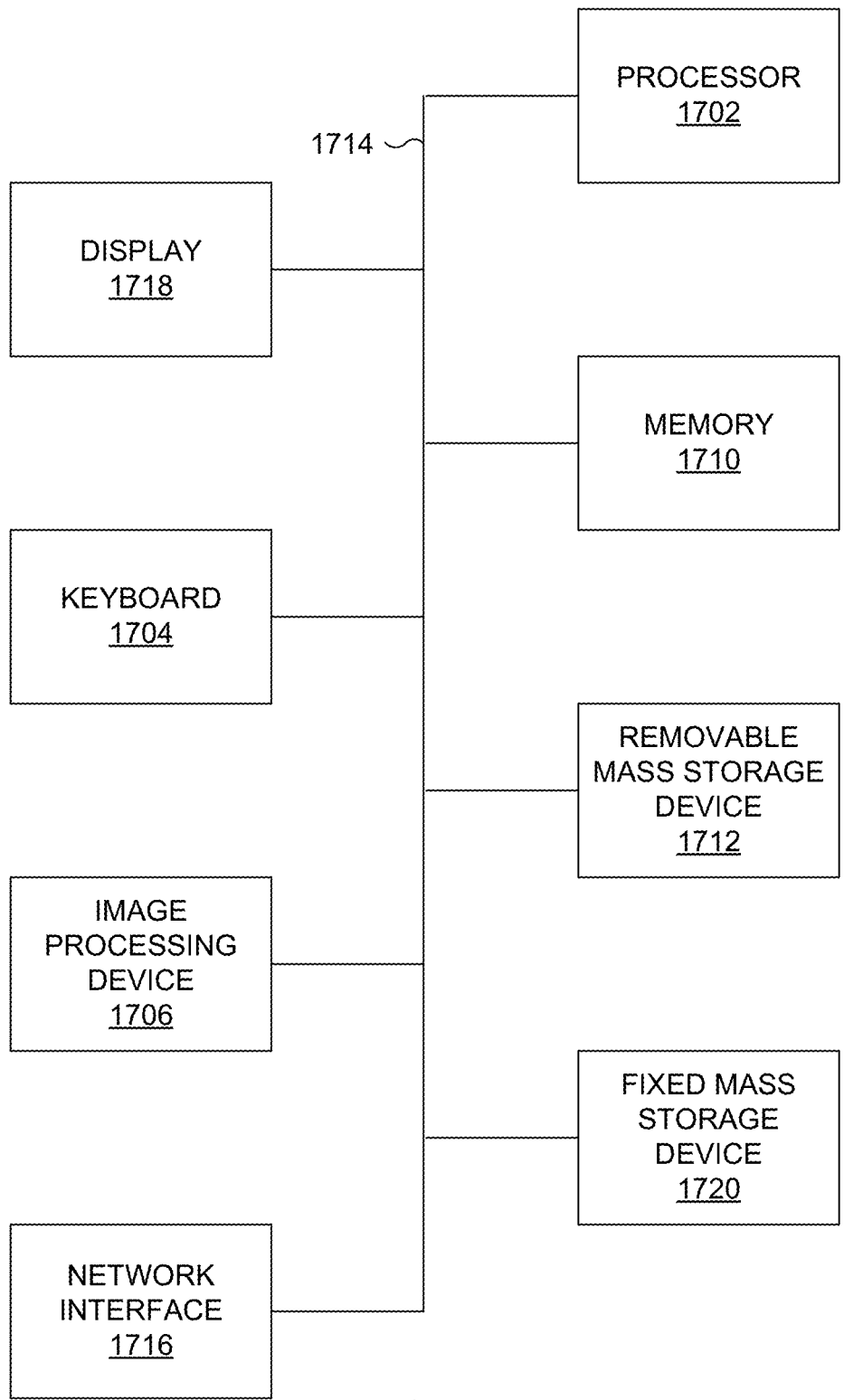
FIG. 17 is a functional diagram illustrating a programmed computer system for generating a design of a product in accordance with some embodiments.

FIG. 17 is a functional diagram illustrating a programmed computer system for generating a design of a product in accordance with some embodiments. As will be apparent, other computer system architectures and configurations can be used to perform the described product generation technique. Computer system 1700, which includes various subsystems as described below, includes at least one microprocessor subsystem (also referred to as a processor or a central processing unit (CPU) 1702). For example, processor 1702 can be implemented by a single-chip processor or by multiple processors. In some embodiments, processor 1702 is a general purpose digital processor that controls the operation of the computer system 1700. In some embodiments, processor 1702 also includes one or more coprocessors or special purpose processors (e.g., a graphics processor, a network processor, etc.). Using instructions retrieved from memory 1710, processor 1702 controls the reception and manipulation of input data received on an input device (e.g., image processing device 1706, I/O device interface 1704), and the output and display of data on output devices (e.g., display 1718).

Processor 1702 is coupled bi-directionally with memory 1710, which can include, for example, one or more random access memories (RAM) and/or one or more read-only memories (ROM). As is well known in the art, memory 1710 can be used as a general storage area, a temporary (e.g., scratch pad) memory, and/or a cache memory. Memory 1710 can also be used to store input data and processed data, as well as to store programming instructions and data, in the form of data objects and text objects, in addition to other data and instructions for processes operating on processor 1702. Also as is well known in the art, memory 1710 typically includes basic operating instructions, program code, data, and objects used by the processor 1702 to perform its functions (e.g., programmed instructions). For example, memory 1710 can include any suitable computer readable storage media described below, depending on whether, for example, data access needs to be bi-directional or uni-directional. For example, processor 1702 can also directly and very rapidly retrieve and store frequently needed data in a cache memory included in memory 1710.

A removable mass storage device 1712 provides additional data storage capacity for the computer system 1700, and is optionally coupled either bi-directionally (read/write) or uni-directionally (read only) to processor 1702. A fixed mass storage 1720 can also, for example, provide additional data storage capacity. For example, storage devices 1712 and/or 1720 can include computer readable media such as magnetic tape, flash memory, PC-CARDS, portable mass storage devices such as hard drives (e.g., magnetic, optical, or solid state drives), holographic storage devices, and other storage devices. Mass storages 1712 and/or 1720 generally store additional programming instructions, data, and the like that typically are not in active use by the processor 1702. It will be appreciated that the information retained within mass storages 1712 and 1720 can be incorporated, if needed, in standard fashion as part of memory 1710 (e.g., RAM) as virtual memory.

In addition to providing processor 1702 access to storage subsystems, bus 1714 can be used to provide access to other subsystems and devices as well. As shown, these can include a display 1718, a network interface 1716, an input/output (I/O) device interface 1704, an image processing device 1706, as well as other subsystems and devices. For example, image processing device 1706 can include a camera, a scanner, etc.; I/O device interface 1704 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 1700. Multiple I/O device interfaces can be used in conjunction with computer system 1700. The I/O device interface can include general and customized interfaces that allow the processor 1702 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 1716 allows processor 1702 to be coupled to another computer, computer network, or telecommunications network using a network connection as shown. For example, through the network interface 1716, the processor 1702 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 1702 can be used to connect the computer system 1700 to an external network and transfer data according to standard protocols. For example, various process embodiments disclosed herein can be executed on processor 1702, or can be performed across a network such as the Internet, intranet networks, or local area networks, in conjunction with a remote processor that shares a portion of the processing. Additional mass storage devices (not shown) can also be connected to processor 1702 through network interface 1716.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 17 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 1704 and display 1718 share the touch sensitive screen component, which both detects user inputs and displays outputs to the user). In addition, bus 1714 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for optimizing computer machine learning, comprising:
receiving an optimization goal;
using the optimization goal to search a database of base option candidates to identify one or more matching base option candidates that at least in part matches the optimization goal;
receiving a selection of a base option among the one or more matching base option candidates based in part on a ranking of the base option among the one or more matching base option candidates, wherein the base option is scored based in part on a divergence between actual performance that includes measured sales data of the base option and performance that includes expected sales data of the base option predicted by one or more machine learning prediction models, wherein the base option has a score above a threshold score, wherein the base option and the one or more matching base option candidates are ranked based on their corresponding scores;
utilizing the one or more machine learning prediction models selected based at least in part on the optimization goal to determine prediction values associated with alternative features for the base option, wherein the one or more machine learning prediction models were trained using training data to at least identify machine learning weight values associated with the alternative features for the one or more machine learning prediction models;
based on the prediction values, sorting at least a portion of the alternative features to generate an ordered list of at least the portion of the alternative features for the selected base option; and
providing the ordered list for use in manufacturing an alternative version of the selected base option with one or more of the alternative features in the ordered list.

2. The method of claim 1, further comprising identifying one or more components of optimization goal, wherein the one or more components includes at least one of an optimization type and a target segment.

3. The method of claim 1, wherein using the optimization goal to identify one or more matching base option candidates is based at least in part on past performance data associated with the one or more matching base option candidates.

4. The method of claim 1, wherein using the optimization goal to identify one or more matching base option candidates is based at least in part on a variety metric of the one or more matching base option candidates.

5. The method of claim 1, wherein the database of base option candidates includes a catalog of products and the selection of a selected base option is made by a user.

6. The method of claim 1, wherein utilizing the one or more machine learning prediction models includes selecting training data based on the optimization goal.

7. The method of claim 1, wherein sorting at least a portion of the alternative features includes selecting the one or more machine learning prediction models based on the optimization goal to predict a set of features including the at least a portion of the alternative features.

8. The method of claim 1, wherein utilizing the one or more machine learning prediction models includes determining a combination of at least two features and identifying an associated machine learning weight value for the combination of the at least two features.

9. The method of claim 1, wherein utilizing the one or more machine learning prediction models includes supervised learning of the training data.

10. The method of claim 1, wherein utilizing the one or more machine learning prediction models includes determining a role of an alternative feature in a predicted performance of a base option.

11. The method of claim 1, further comprising selecting the at least the portion of the alternative features based on at least one of natural language processing and computer vision, wherein the alternative features are filtered based on eligibility for the selected base option.

12. The method of claim 1, further comprising:
receiving a selection of at least one of the alternative features in the ordered list;
identifying one or more example base options having the selected at least one of the alternative features; and
providing the one or more example base options.

13. The method of claim 1, wherein the optimization goal includes predicted performance with respect to a segment.

14. The method of claim 1, wherein an alternative feature is selected for inclusion in the ordered list of alternative features based at least in part on a sales metric of a set of features including the alternative feature.

15. The method of claim 1, wherein an alternative feature is selected for inclusion in the ordered list of alternative features based at least in part on a rating metric of a set of features including the alternative feature.

16. The method of claim 1, wherein an alternative feature is selected for inclusion in the ordered list of alternative features based at least in part on a variety metric of an inventory having a set of features including the alternative feature.

17. The method of claim 1, further comprising automatically generating a design of a product, wherein the product includes the alternative version of the selected base option with one or more of the alternative features in the ordered list.

18. A system for optimizing computer machine learning, comprising:

a communications interface configured to:
  receive an optimization goal; and
  receive a selection of a base option among one or more matching base option candidates based in part on a ranking of the base option among the one or more matching base option candidates, wherein the base option is ranked based in part on a divergence between actual performance that includes measured sales data of the base option and performance that includes expected sales data of the base option predicted by one or more machine learning prediction models, wherein the base option has a score above a threshold score, wherein the base option and the one or more matching base option candidates are ranked based on their corresponding scores;
a processor configured to:
  utilize the one or more machine learning prediction models selected based at least in part on the optimization goal to determine prediction values associated with alternative features for the selected base option, wherein the one or more machine learning prediction models were trained using training data to at least identify machine learning weight values associated with the alternative features for the one or more machine learning prediction models;
  based on the prediction values, sort at least a portion of the alternative features to generate an ordered list of at least the portion of the alternative features for the selected base option; and
  provide the ordered list for use in manufacturing an alternative version of the selected base option with one or more of the alternative features in the ordered list.

19. A computer program product for optimizing computer machine learning, the computer program product being embodied in a non-transitory computer readable storage medium and comprising computer instructions for:

receiving an optimization goal;
using the optimization goal to search a database of base option candidates to identify one or more matching base option candidates that at least in part matches the optimization goal;
receiving a selection of a base option among the one or more matching base option candidates based in part on a ranking of the base option among the one or more matching base option candidates, wherein the base option is ranked based in part on a divergence between actual performance that includes measured sales data of the selected base option and performance that includes expected sales data of the base option predicted by one or more machine learning prediction models, wherein the base option has a score above a threshold score, wherein the base option and the one or more matching base option candidates are ranked based on their corresponding scores;
utilizing the one or more machine learning prediction models selected based at least in part on the optimization goal to determine prediction values associated with alternative features for the selected base option, wherein the one or more machine learning prediction models were trained using training data to at least identify machine learning weight values associated with the alternative features for the one or more machine learning prediction models;
based on the prediction values, sorting at least a portion of the alternative features to generate an ordered list of at least the portion of the alternative features for the selected base option; and
providing the ordered list for use in manufacturing an alternative version of the selected base option with one or more of the alternative features in the ordered list.

* * * * *